(12) United States Patent
Chisnall et al.

(10) Patent No.: US 12,013,794 B2
(45) Date of Patent: *Jun. 18, 2024

(54) CONFIDENTIAL COMPUTING MECHANISM

(71) Applicant: Microsoft Technology Licensing, LLC, Redmond, WA (US)

(72) Inventors: David T. Chisnall, Cambridge (GB); Sylvan W. Clebsch, Cambridge (GB); Cédric Alain Marie Christophe Fournet, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/774,585

(22) PCT Filed: Oct. 28, 2020

(86) PCT No.: PCT/US2020/057798
§ 371 (c)(1),
(2) Date: May 5, 2022

(87) PCT Pub. No.: WO2021/091744
PCT Pub. Date: May 14, 2021

(65) Prior Publication Data
US 2022/0391326 A1   Dec. 8, 2022

(30) Foreign Application Priority Data
Nov. 6, 2019   (EP) ..................................... 19207502

(51) Int. Cl.
*G06F 12/14* (2006.01)
(52) U.S. Cl.
CPC ........ *G06F 12/145* (2013.01); *G06F 12/1441* (2013.01); *G06F 12/1458* (2013.01); *G06F 2212/1052* (2013.01)

(58) Field of Classification Search
CPC ............. G06F 12/0842; G06F 12/1027; G06F 12/1081; G06F 12/1441; G06F 12/145;
(Continued)

(56) References Cited

U.S. PATENT DOCUMENTS

| | | | |
|---|---|---|---|
| 7,779,254 B1 * | 8/2010 | Crosmer | G06F 21/74 710/22 |
| 7,882,317 B2 | 2/2011 | Hunt et al. | |

(Continued)

FOREIGN PATENT DOCUMENTS

| | | |
|---|---|---|
| CN | 104317899 A | 1/2015 |
| EP | 2889800 A1 | 7/2015 |

(Continued)

OTHER PUBLICATIONS

"Understanding Memory Resource Management in VMware® ESX™ Server", In White Paper of vmware, Aug. 20, 2009, pp. 1-20.
(Continued)

*Primary Examiner* — Aracelis Ruiz
(74) *Attorney, Agent, or Firm* — Barta Jones, PLLC

(57) ABSTRACT

According to a first aspect, execution logic is configured to perform a linear capability transfer operation which transfers a physical capability from a partition of a first software modules to a partition of a second of software module without retaining it in the partition of the first. According to a second, alternative or additional aspect, the execution logic is configured to perform a sharding operation whereby a physical capability is divided into at least two instances, which may later be combined.

20 Claims, 5 Drawing Sheets

(58) Field of Classification Search
CPC ............... G06F 12/1458; G06F 16/278; G06F 2212/1052
See application file for complete search history.

(56) References Cited

U.S. PATENT DOCUMENTS

| | | | |
|---|---|---|---|
| 8,566,680 | B1 | 10/2013 | Cousins |
| 8,656,465 | B1 | 2/2014 | Fong-jones |
| 9,870,466 | B2 | 1/2018 | Woodward et al. |
| 9,935,975 | B2 | 4/2018 | Wilkerson et al. |
| 10,366,062 | B1 | 7/2019 | Lazier et al. |
| 2003/0115476 | A1 | 6/2003 | Mckee |
| 2007/0283115 | A1 | 12/2007 | Freeman et al. |
| 2013/0159726 | A1 | 6/2013 | Mckeen et al. |
| 2014/0020085 | A1 | 1/2014 | Srour et al. |
| 2015/0089502 | A1 | 3/2015 | Horovitz et al. |
| 2016/0210248 | A1 | 7/2016 | Kondou |
| 2016/0306649 | A1 | 10/2016 | Gunti et al. |
| 2017/0235507 | A1 | 8/2017 | Sinha et al. |
| 2018/0330078 | A1 | 11/2018 | Gray |
| 2018/0349419 | A1 | 12/2018 | Annamalai et al. |
| 2019/0007216 | A1 | 1/2019 | Meriac |
| 2019/0050581 | A1 | 2/2019 | Chhabra et al. |
| 2019/0272159 | A1 | 9/2019 | Pizlo et al. |
| 2019/0319838 | A1 | 10/2019 | Milojicic |
| 2020/0004568 | A1 | 1/2020 | Candido De, Jr. |
| 2020/0169395 | A1 | 5/2020 | Hong |
| 2020/0201786 | A1 | 6/2020 | Ouziel et al. |
| 2022/0374349 | A1 | 11/2022 | Chisnall et al. |

FOREIGN PATENT DOCUMENTS

| | | |
|---|---|---|
| EP | 3446222 A1 | 2/2019 |
| GB | 2572151 A | 9/2019 |
| GB | 2572151 B | 7/2020 |
| KR | 20130018108 A | 2/2013 |
| WO | 2018146207 A1 | 8/2018 |

OTHER PUBLICATIONS

"Extended European Search Report Issued in European Patent Application No. 19207496.1", dated Apr. 6, 2020, 13 Pages.
"Extended European Search Report Issued in European Patent Application No. 19207502.6", dated May 15, 2020, 11 Pages.
"Notice of Allowance Issued in European Patent Application No. 19207502.6", dated Apr. 29, 2022, 2 Pages.
"Notice of Allowance Issued in European Patent Application No. 19207502.6", dated Jun. 15, 2021, 7 Pages.
"Notice of Allowance Issued in European Patent Application No. 19207502.6", dated Dec. 15, 2021, 7 Pages.
Bulck, et al., "Breaking Virtual Memory Protection and the SGX Ecosystem with Foreshadow", In Journal of IEEE Micro, vol. 39, Issue 3, May 2019, pp. 66-74.
Figueroa, et al., "Effect Capabilities for Haskell: Taming Effect Interference in Monadic Programming", In Journal of Science of Computer Programming, vol. 119, Apr. 1, 2016, pp. 3-30.
Joannou, "Efficient Tagged Memory", In Proceeding of IEEE International Conference on Computer Design, Nov. 5, 2017, pp. 641-648.
Joannou, Alexandre J.P. , "High-Performance Memory Safety—Optimizing the CHERI Capability Machine", In Technical Report UCAM-CL-TR-936, May 2019, 132 Pages.
Nanavati, Mihir Sudarshan, "Breaking Up is Hard to Do: Security and Functionality in a Commodity Hypervisor", In Thesis Submitted to University of British Columbia, Jun. 2011, 58 Pages.
"International Search Report and Written Opinion Issued in PCT Application No. PCT/US20/056399", dated Feb. 5, 2021, 17 Pages.
"International Search Report & Written Opinion issued in PCT Application No. PCT/US20/057798", dated Jan. 19, 2021, 12 Pages.
Poddar, et al., "SafeBricks: Shielding Network Functions in the Cloud", In Proceedings of 15th USENIX Symposium on Networked Systems Design and Implementation, Apr. 9, 2018, pp. 201-216.
Tsai, et al., "Civet: An Efficient Java Partitioning Framework for Hardware Enclaves", In Proceedings of the 29th USENIX Security Symposium, Oct. 1, 2019, 18 Pages.
Watson, et al., "CHERI: A Hybrid Capability-System Architecture for Scalable Software Compartmentalization", In Proceedings of IEEE Symposium on Security and Privacy, May 17, 2015, 18 Pages.
Watson, et al., "Capability Hardware Enhanced RISC Instructions: CHERI Instruction-set architecture", In the Technical Report UCAM-CL-TR-850, No. 850, University of Cambridge, Computer Laboratory, Apr. 2014, pp. 1-131.
Watson, et al., "Capability Hardware Enhanced RISC Instructions: CHERI Instruction-Set Architecture", In the Technical Report UCAM-CL-TR-876, No. 876, University of Cambridge, Computer Laboratory, Sep. 2015, 198 Pages.
Watson, et al., "Capability Hardware Enhanced RISC Instructions: CHERI Instruction-Set Architecture (Version 6)", In Technical Report of UCAM-CL-TR-907, Apr. 2017, 307 Pages.
Zeldovich, et al., "Hardware Enforcement of Application Security Policies Using Tagged Memory", In Proceedings pf 8th USENIX Symposium on Operating Systems Design and Implementation, Dec. 8, 2008, pp. 225-240.
"Office Action Issued in European Patent Application No. 20801432.4", dated Feb. 28, 2023, 6 Pages.
"Non-Final Office Action Issued in U.S. Appl. No. 17/774,609", dated Apr. 21, 2023, 38 Pages.
Watson, et al., "Capability Hardware Enhanced RISC Instructions: CHERI Instruction-Set Architecture", In Technical Report of UCAM-CL-TR-927, No. 927, University of Cambridge, Computer Laboratory, Jun. 2019, pp. 1-496.
"Final Office Action Issued in U.S. Appl. No. 17/774,609", dated Oct. 18, 2023, 38 Pages.
Communication under Rule 71(3) EPC, Received for European Application No. 20801432.4, mailed on Feb. 13, 2024, 07 pages.
Notice of Allowance mailed on Apr. 11, 2024, in U.S. Appl. No. 17/774,609, 11 pages.

* cited by examiner

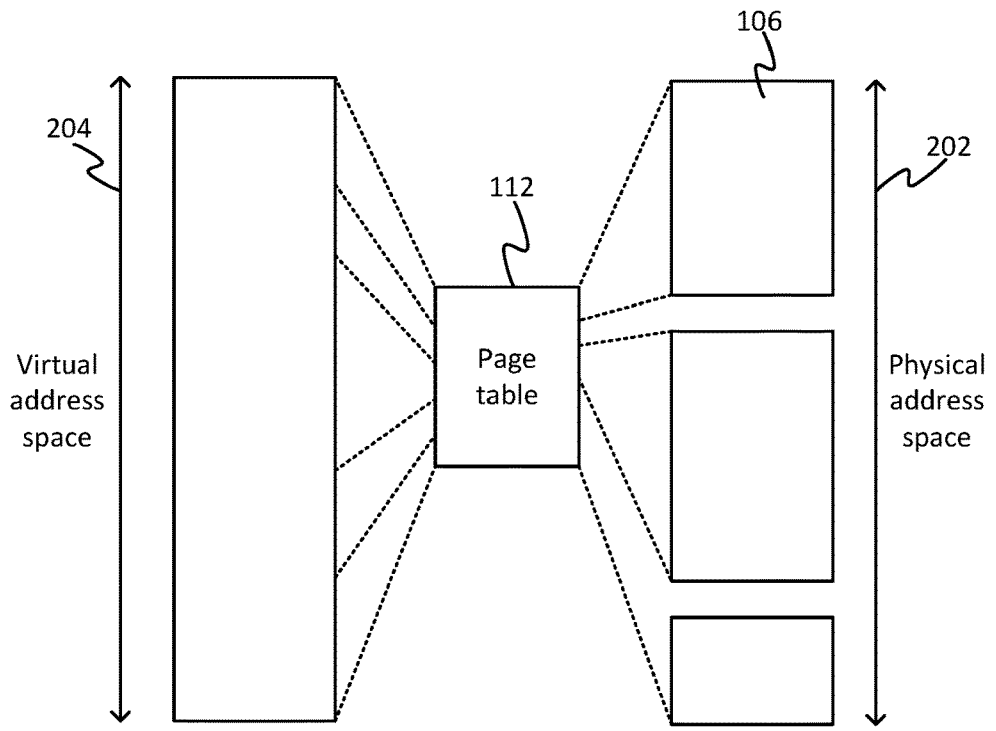
Figure 2
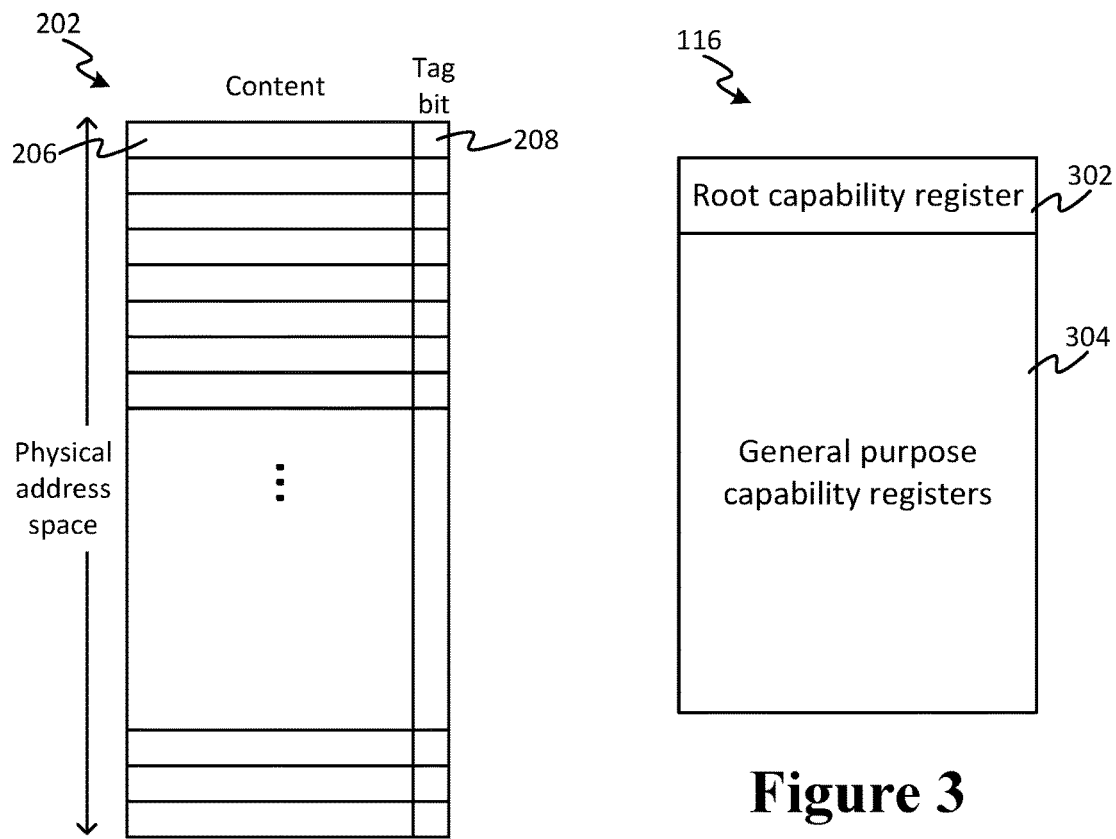
Figure 2A
Figure 3

CONFIDENTIAL COMPUTING MECHANISM

BACKGROUND

Traditionally, an operating system (OS) is able to see all the data of all applications running on the operating system. "See" here means able to inspect and modify all the same application data from the same region(s) of memory that the application can. Similarly, if the operating system runs on a hypervisor, then the hypervisor can see all the data of the operating system and applications. This implies a hierarchical system of trust whereby the applications trust the operating system, and the operating system trusts the hypervisor.

More recently, the idea of an "enclave" has been introduced, whereby an application can run in a confidential environment which makes the data of the application inaccessible to the operating system or hypervisor. This removes the idea of hierarchical trust: the application doesn't need to trust the operating system and the operating system doesn't need to trust the hypervisor. As an example application, this would enable a tenant of a data centre to keep its data confidential from the operator of the data centre.

Access to memory can be restricted by a system of capabilities. "Capability" is a term of art referring to an unforgeable digital token of authority, e.g. that grants access to a specified memory address range. It is known to provide a system of capabilities that are enforced in hardware. This means that a machine code instruction that attempts to access some target address in memory, such as load or store instruction, will trigger a hardware check for a corresponding capability granting access the target address. The software in question must possess and be able to present the capability in order to be granted access.

One example is CHERI (Capability Hardware Enhanced RISC Instructions). This is implemented by a system of "fat" pointers along with some dedicated additions to the instruction set architecture of the processor. E.g. the source operand of a traditional load instruction would typically specify a register holding a pointer to the target address (in this case the source of the load). In CHERI the instruction would also need to specify a register that holds a capability granting access to the target address, thus augmenting the pointer with the capability. The capabilities in the registers can only be manipulated by dedicated machine code instructions specially included in the instruction set according to the CHERI architecture.

Capabilities are protected in memory. Hardware memory capability systems have done this in two ways. The first way is by restricting where capabilities can be stored in memory. Capabilities can be stored only in specific regions and everything in those regions is a capability or an explicit invalid capability value (typically zero). The CAP computer used this model, for example. The second way is by using some form of tagged memory, where a non-addressable bit is set when a valid capability is stored and cleared when any other data is stored to the same location. CHERI (and the M-Machine and some other systems) use this model.

In the existing CHERI system, capabilities grant access to specified ranges of virtual addresses on the virtual address side of the address translation. As will be familiar to a person skilled in the art, almost all general-purpose computer systems nowadays employ virtual memory. That is, the system comprises a page table (usually actually implemented as a tree) which maps between a virtual address space the physical address space of the actual physical memory device(s). The reason for this is to abstract the address space used by software from the actual underlying physical memory resources. The target address is specified by the software in terms of a virtual address, and the system automatically uses the page table to translate to the corresponding physical address. Typically the translation is done automatically in hardware by a memory management unit (MMU). The page table may be populated and managed by low-level system code, such as a kernel of the hypervisor or OS. A translation look-aside buffer (TLB) may also be used to cache page table entries. In a software-managed TLB, the TLB is filled by software walking the page table (or equivalent data structure), whereas in a hardware-managed TLB the hardware inspects the page table to fill the TLB.

CHERI capabilities also provide access to physical memory in systems without address translation, but that are not used for physical memory on systems that do provide address translation

SUMMARY

The present disclosure relates to a system comprising: execution logic comprising one or more execution units, memory comprising one or more memory units, and memory access logic for looking-up a mapping between a physical address space of the memory and a virtual address space. The execution logic is arranged to run a plurality of software modules each in a respective partition of the physical address space, including to execute a memory access operation performed by a currently-executing one of said software modules. The memory access operation specifies a virtual address in the virtual address range as a target of the memory access operation. The memory access logic is configured to perform operations of: looking-up a physical address in the physical address space mapped to the virtual address, checking whether a capability granting access to said physical address is found in a storage location to which the currently-executing software module has access, and on condition thereof, granting access to said physical address for performing said memory access operation.

According to one aspect disclosed herein, the execution logic is configured to perform a linear capability transfer operation which transfers one of the capabilities from the partition of a first of said software modules to the partition of a second of said software modules without retaining it in the partition of the first.

According to a second aspect disclosed herein, the execution unit is configured to perform a sharding operation whereby one of the capabilities is divided into at least two instances, and the execution unit is further configured to perform a shard recombination operation whereby the instances are recombined.

The first and second aspects may be used together or independently.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 is a schematic illustration of memory address translation between virtual and physical addresses, FIG. 2A is a schematic block diagram of a physical address space with tag bits in accordance with embodiments disclosed herein, FIG. 3 is a schematic block diagram of a set of capability registers in accordance with embodiments disclosed herein.

DETAILED DESCRIPTION

Figure 1:
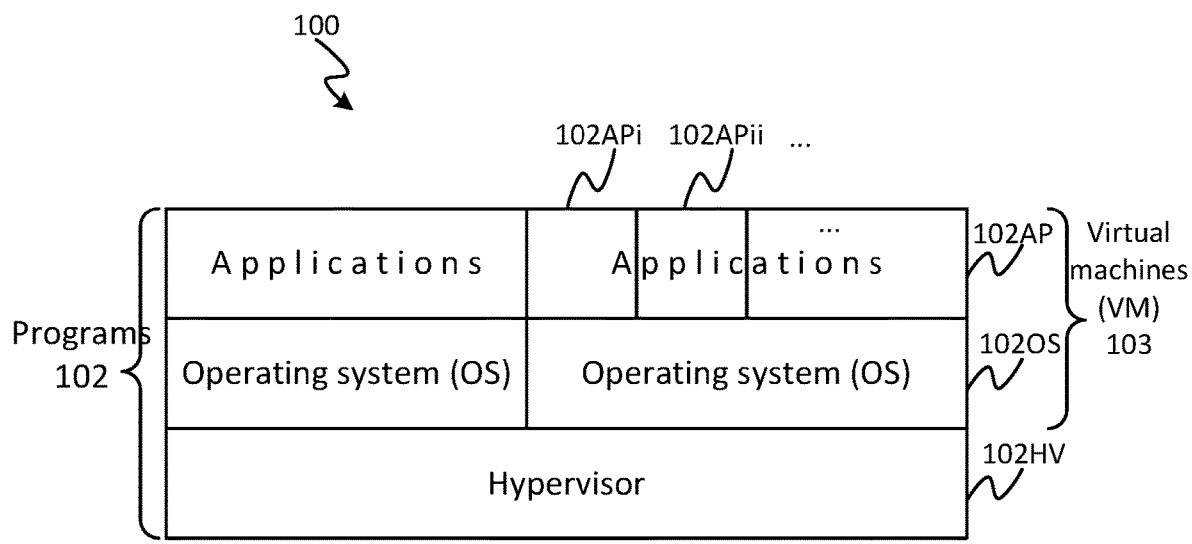
FIG. 1 is a schematic illustration of a program stack.

The present disclosure relates to a system of capability-based hardware-enforced isolation. According to a first aspect, it provides a system of capabilities that are applied in the physical address space on the physical side of the address translation, rather than the virtual address space on the virtual side of the address translation. Further, the disclosed system provides a mechanism whereby capabilities can be passed between modules of software in a "linear" manner, i.e. passed from one to the other like a baton without being retained by the first. Because the capabilities are both physical and transferred linearly, together these features mean that a low-level piece of system software such as the hypervisor or operating system can pass a capability for a certain physical address range to a higher level piece of software such as an application, and then the application will have any data in the corresponding address range kept private from the OS or hypervisor. As the capabilities are enforced on the physical address range, even low-level system code responsible for populating the address translation page tables cannot get around it.

Without capabilities, enclaves are implemented via a reverse lookup. After address translation, the MMU looks up who owns the page. Typically there is a flat table with one entry per physical page, which defines the owner of a page. Sometimes this is done via a mix of hardware and software, where the hardware checks a bit indicating 'this page is secret' and the software enforces the invariant that a secret page is owned by a single owner. Alternatively, sometimes it is done entirely in software with a small trusted bit of software enforcing the invariant. This gives the same thing that can be expressed with purely linear capabilities: running software can validate that it is the sole owner of a given page and it is not exposed to other things. An advantage of linear capabilities over a table-based approach, or access-control-based hardware approach, is that the lookups only run one way, and delegation from one isolated region to another doesn't need to go through a single trusted entity. Over a hybrid approach, it simplifies the verification of the software layer. Another benefit is that it makes it easy to implement pages that are writeable by one party and readable by one or more other parties (e.g. ring buffers for virtual devices).

According to a second aspect, there is provided a system of sharded capabilities which can be split a known number of times. The ability to shard a capability gives more flexibility than a strict linear capability, but without allowing uncontrolled proliferation of the capability. Because the system keeps track of what fraction of the original (exclusive) capability the current shard is, then the shards can later be reconstructed to restore exclusivity. Preferably the capability is also only allowed to be divided a finite number of times, such that a given region of physical memory can be shared between only a limited number of applications or other such modules of software.

Sharding can advantageously be used together with the concept of linear capabilities. For instance with an 8-bit split field, a page can be shared between up to 256 entities (enclaves, isolated VMs, whatever) and each of those can cheaply check the maximum number of others that own it. This makes it easy to enforce guarantees such as that a page is shared between two enclaves or between an isolated VM and an enclave, but hidden from the hypervisor. Doing this with a table-based scheme means that each table entry would be needed to be able to identify all of the principals that may have access to the page, which would give you a very large table (and a large lookup cost). Doing this with capabilities gives a simple forward check.

The disclosed mechanism makes it possible to build isolated virtual machines (VMs), hardware enclaves, and the like. It may be used as a standalone mechanism, or it may for example be combined with an existing scheme such as the CHERI memory capability model (composed with CHERI and doing so will allow some aspects of the hardware implementation to be shared). One aspect provides involves adding linear capabilities that grant access to physical memory. Another alternative or additional aspect involves sharding of physical capacities (finite, recorded division of a physical capability). Traditional CHERI capabilities work with virtual addresses and are checked before memory translation. Physical capabilities are used after address translation and can restrict system software.

In embodiments, as with normal CHERI capabilities, the set of rights granted by a capability can be manipulated using a small set of safe instructions.

Unlike existing systems, which have a strict trust relationship, the disclosed design makes it possible to express mutual distrust. For example, it is possible for two VMs to share a page of memory that no other VM (nor the hypervisor) can access. This makes it possible to implement complex confidential computing designs.

An example application is to cloud-based confidential computing, which is currently a growth area. The ability for customers to run complex workloads with strong guarantees that the hypervisor or OS does not have access to their data is an important differentiator.

FIG. 1 illustrates an example program stack 100 in accordance with one example application of the presently disclosed techniques. The stack 100 comprises a plurality of programs 102, including at least an operating system (OS) 102OS and one or more applications 102AP running on the operating system. Optionally, in some cases the stack 100 may further comprise a hypervisor 102HV and the operating system 102OS may be arranged to run on the hypervisor. In this case the operating system 102OS and application(s) 102AP together form a virtual machine (VM) 103. A hypervisor, also known as a virtual machine monitor (VMM), is a low-level piece of software for running virtual machines. There may be one or more virtual machine 103 running on the hypervisor 102HV, each with its own operating system 102OS. An example would be where the virtual machines 103 of multiple different tenants are all run on the same data centre or cloud computing host service.

In embodiments, the same mechanism can also implement TrustZone-like abstractions, where one can have one or more of these layers in a secure vs non-secure world, for example allowing an OS to run that the Hypervisor cannot force to relinquish resources.

FIG. 2 illustrates a memory mapping scheme that may be employed to facilitate access to memory. The memory 104 comprises a physical address space 202 across one or more memory devices, i.e. the actual hardware addresses by which the physical regions of memory in those one or more memory devices 106 are addressed. The physical memory space 202 in question may comprise a memory space of one or more volatile memory devices (RAM) and/or one or more non-volatile memory devices (e.g. HDD or SSD).

A memory page table 112 maps the physical addresses of the physical address space 202 onto corresponding virtual addresses of a virtual address space 204. Note that FIG. 2 is schematic. In practice the page table may be implemented in the physical memory. The page table is a protocol for systems software to communicate with the memory management unit (MMU). The MMU performs the look up, with the aid of either a page table managed by system software or a trusted trap handler that performs cacheable address translation.

When a program 102 such as an application 102AP wants to access memory, such as to perform a load, store or instruction fetch, it specifies an address in the virtual address space 204 as the target memory address, i.e. the source of the load or fetch, or the destination of the store. This is then automatically translated into the virtual address by performing a look-up based on the page table 112. The look-up is typically performed automatically by dedicated hardware circuitry in the memory management unit (MMU). The entries in the page table 112 are populated and managed by low-level system code such as the kernel of the hypervisor 102HV or operating system 102OS.

In embodiments the look up is performed via a translation look-aside buffer (TLB), which is a form of cache. The page table or the address translation fault handler are only consulted directly when the TLB misses. Either way, address translation takes place via some mechanism provided by the MMU, and there is some policy controlling address translation, which is provided by one or more layers of privileged software (either as code or data).

Note: in a scenario with three layers in the stack 100—hypervisor, 102HV, operating system 102OS and application layer 102AP—then in some such embodiments, the operating system may issue a target address in a second tier virtual address, which is converted into a first tier virtual address also sometime called the pseudo-physical address, and the hypervisor 102HV or MMU translates this to the (true) physical address. I.e. a virtual machine 103 may require address translation to be done twice. In such a scenario, if it is said herein that an application specifies a virtual address, or such like, this may be taken to mean that the application vicariously specifies the first tier virtual address (the pseudo-physical) via the operating system. The physical address means the true physical address in the actual physical address space 202.

More generally the present application can apply to any program stack, e.g. in a scenario only involving OS and application(s) but not hypervisor, or to a scenario involving more layers.

The present disclosure relates to providing isolation between different modules of software, so that one module of software cannot get access to the code or data of another module of software. This is important for privacy and data security. E.g. the modules of software could comprise the hypervisor 102HV, an operating system 102OS running on the hypervisor, and/or one or more applications 102AP running on the operating system. For instance it may be desired to create an enclave whereby the operating system 102OS and hypervisor 102HV cannot view the data of a certain application 102AP even though that application is running on the operating system. Or it may be desired to prevent one party's application 102APi getting access to the data of another party's application 102APii without trusting the OS or hypervisor to prevent this.

In a conventional model, the hypervisor 102HV partitions off a region of the virtual address space for use by the operating system, and then from within that region of memory the operating system 102OS partitions off regions for each of the applications 102AP running on that operating system. This is done as part of a dynamic partitioning (i.e. memory can be added to or removed from any of the higher layers as the program runs). The operating system 102OS has the ability to access all the data of the applications 102AP in all of the memory address space it has allocated to them, and the hypervisor 102HV has the ability to access all the data in all of the address space it has allocated to the operating system 102OS. The hypervisor 102HV can also restrict what the operating system 102OS has access to, and the operating system 102OS can restrict what its applications 102AP have access to. Therefore there must be a hierarchical system of trust between the different layers of the stack 100: the operating system 102OS must trust the hypervisor 102HV, and the applications 102AP must trust the operating system 102OS. E.g. the hypervisor 102HV could become compromised and snoop on the data of the operating system 102OS or one of the applications 102AP, or could be malicious from the start.

It would be desirable to change this "nested" model whereby each level or layer in the stack 100 has access to the memory address space allocated to next layer up, e.g. such that the operating system 102OS doesn't have to completely trust the hypervisor 102HV, and/or an enclaved application 102AP doesn't have to completely trust the operating system 102OS. Thus there need no longer be the concept that a more trusted component always has access to the memory of less trusted components running above it, and it will become possible to guarantee confidentiality and integrity of data owned by of the applications 102AP even if the hypervisor 102HV or operating system 102OS is compromised, for example. In embodiments, the hypervisor and OS may still be retained in the TCB (trusted computing base) for availability, but not for confidentiality or integrity. In that case a malicious hypervisor could still elect simply to never run a particular VM and there's nothing that the VM can do to prevent that. But nonetheless, with the disclosed mechanism, the guarantee is that the hypervisor cannot inspect or tamper with memory owned by the VM.

The hypervisor 102HV may still be responsible for partitioning off the memory for the operating system 102OS, and the operating system may still be responsible for partitioning off memory for its applications 102AP. However, once the partitioned is done, the hypervisor 102HV cannot necessarily any longer access the memory it has allocated to the operating system 102OS, and/or the operating system cannot necessarily any longer access the memory it has allocated to one or more of its applications 102AP. And the new owner of the memory can easily validate that it has exclusive ownership.

The present disclosure achieves this via a system of physical capabilities, that are preferably also enforced in hardware. A "capability" is a kind of token that a module of software needs in order to access a particular region of memory. Each capability specifies a respective range of addresses to which it grants access. If a given module of software is not in possession of the relevant token, then it is not allowed access to that region of memory. This enables isolation, by only giving the token (i.e. the "capability") to a select one or more (but not all) of the software modules running on the system.

A physical capability is a capability that operates at the level of physical memory addresses, rather than virtual addresses. Only a module of software that is able to present the relevant token (i.e. capability) is allowed to access to the corresponding region of physical memory. A hardware-enforced capability is a capability where the check for a capability is enforced at least in part by dedicated hardware of the processor. If the check fails then the memory access fails, and an exception may be raised.

According to a first aspect disclosed herein, there is provided a mechanism of linear physical capabilities.

A linear capability is a capability that is passed around between modules of software like a baton. I.e. once it is passed from a first module of software to a second, then the first module does not keep a copy. E.g. the operating system starts off with a capability and then passes the capability to an application, and now the application has that capability but the operating system is not able to keep a copy, so the operating system has given over its right to access the corresponding region of memory. Whereas with a non-linear capability, the operating system could choose to pass on the capability and keep a copy itself.

The inventors are not aware that it has not previously been disclosed to provide a system of capabilities that are both physical and linear in nature.

According to a second, alternative or additional aspect disclosed herein, there is provided a mechanism for "sharding" of physical capabilities A "sharded" capability can be divided and thus shared between different modules of software (e.g. two applications, or both OS and application), but the system keeps track of how many copies ("shards") have been made. The shards can thus be reassembled back with one another to reduce the number in circulation. In embodiments a capability can also only be divided only up to a maximum number of times. A limit on the number of times a capability can be divided is not essential. The split count enables the owner of one shard to identify the maximum number of other sharded owners. For example, an enclave may wish to validate that the OS can access a shared region but that the hypervisor cannot. This is possible with a finite split count and where the enclave has all except for one of the shares. If there was an infinitely divisible split count, then the two-party case would be the same as the multi-party case (one would need a protocol to ensure that the cooperating group all share the fractions that add up to 1).

The inventors are not aware that it has previously been disclosed to provide a system of capabilities that are both physical and able to be sharded.

By means of a small and simple set of hardware extensions, the presently disclosed system is thus able to provide strict isolation and/or controlled sharding, thereby restricting communication boundaries between different modules of software.

The combination of the physical sharded linear capabilities and their interaction with the system (e.g. the MMU and interrupt mechanism) enables a flexible way of providing mutual distrust.

Figure 1A:
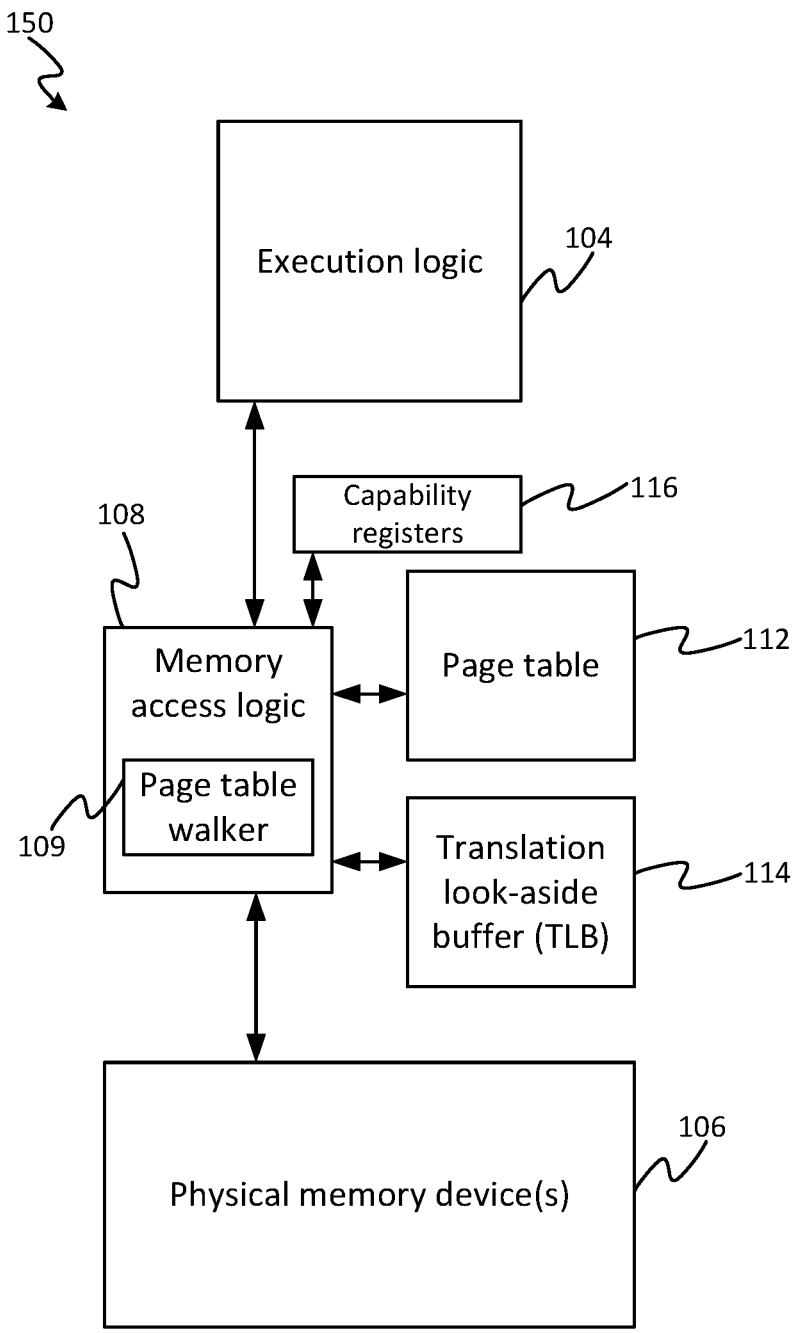
FIG. 1A is a schematic block diagram of a computing system in accordance with embodiments disclosed herein.

FIG. 1A illustrates an example computer system 150 for implementing embodiments disclosed herein. The system 150 comprises execution logic 104, memory 106, memory access logic 108, the page table 112, and optionally a translation look-aside buffer 114. In accordance with embodiments disclosed herein, the system 150 may further comprise a set of capability registers 116.

The execution logic 104 comprises one or more execution units (i.e. cores) implemented in hardware. The execution logic 104 may also be referred to as a processor or processing unit. It may for example take the form of a CPU (central processing unit), or an application specific processor such as a GPU (graphics processing unit), DSP (digital signal processor), etc. Each execution unit may take the form of an execution pipeline comprising a plurality of pipeline stages such as an instruction fetch stage, decode stage, execution stage, arithmetic logic unit (ALU), floating point logic unit (FPU), load/store unit (LSU), or the like. The execution logic 104 is configured to execute instances of instructions from a specific instruction set, which is the fundamental set of machine code types recognized by the execution logic. Each machine code instruction comprises an opcode definition the type of the instruction and one or more operand fields for taking zero or more operands, depending on the instruction type.

The memory 106 comprises one or more physical memory devices 106. This/these may comprise one or more memory devices on the same die as the execution logic 104, one or more memory devices on different dies in the same IC package, and/or one or more units external to the die and IC package of the execution logic 104. In the case of execution units external to the device, either the MMU will be used for DMA or the logical MMU will be implemented as multiple physical MMUs, controlling access from different devices. The one or more memory devices may comprise one or more volatile memory devices (e.g. RAM) and/or one or more non-volatile memory devices (e.g. ROM or a writeable storage drive). The one or more memory devices 106 may employ any suitable storage medium or media; e.g. a magnetic storage medium such as a magnetic tape or disk (e.g. as in the case of a hard disk drive, HDD); an electronic storage medium such as EEPROM or flash memory (e.g. as in the case of a solid state drive, SSD); an even optical medium such as an optical disk or glass-based storage; etc.

The memory access logic 108 schematically represents a functional block. In practice it may be implemented, at least in part, in dedicated hardware, such as in the memory management unit (MMU). The MMU would typically be implemented in the same die as the execution logic. Alternatively or additionally, the memory access logic may be implemented, at least in part, in low-level firmware or privileged executive-level software arranged to run on the execution logic. It may also be implemented in any combination of hardware, firmware and/or executive-level software.

The function of the page table 112 has been described previously. It may be implemented in a region of the memory 106 (e.g. in a special executive or reserved region of the memory 106), and/or in a separate dedicated memory unit. In embodiments the page table 112 also provides a mapping of where to find the corresponding capabilities for the various physical address ranges. Note that whilst the page table may be called the page "table" as a matter of convention in the art, more often nowadays it is implemented in the form of a tree. The term "table" in this context is not intended to be limiting to the form of the data structure, and the phrase "page table" could refer to a flat table, a tree or any other suitable form of data structure for matting between virtual and physical memory addresses. The page table may be entirely a software construct that forms an implementation detail of firmware or software that provides the policy to the MMU. More generally, the page table 112 may represent any logic or data structure that enforces memory protection and translation policies defined in software, and which may optionally cache these translations.

The execution logic 104 is configured to execute machine code instructions from a predetermined instruction set defining a predetermined set of instruction types, e.g. add, multiply, etc. Certain types of these instructions are memory access instructions, e.g. load, and store instructions in a RISC type architecture. An instance of any one of these will specify at least one target address for the respective memory access, i.e. a source address in the case of a load or a destination address in the case of a store. Typically the instruction species the target address vicariously by means of an operand of the instruction which indicates a general-purpose register in a register file of the execution logic 104, where the register in turn holds a pointer (the target address). This target address or pointer will be a virtual address in the virtual address range. Other types of operation will also implicitly operate on a target address in memory 106, e.g. an instruction fetch from the current program counter (PC) value. The PC will specify a virtual address in the virtual address space. Or in a CISC type architecture almost any operation may have a memory address operand.

The memory access logic 108 comprises a page table walker 109 which may be implemented in hardware, firmware or software. This is configured so as, when a memory access instruction is executed by the execution logic 104, to automatically translate the virtual target address to a physical address in the memory 106. It does this by looking up the physical address mapped to the virtual target address in the page table 112. The memory access will then be automatically performed on the physical address in memory 106. The same may be done for one or more other type of memory access operation, e.g. an instruction fetch.

The translation look-aside buffer (TLB) is an optimization for caching page table look-ups, in order to speed up the process of address translation on average. The TLB 114 may be implemented in the form of a dedicated cache unit, e.g. an associative cache, it may be implemented in the MMU or separately, but will typically be implemented in the same die as the MMU and execution logic 104.

The root capability register 302 is a dedicated system registers. A system register, also known as a 'machine-specific register' or a 'hardware register', is a register that is not part of the general-purpose register set. The root capability register 302 can only be used by one or more of a special set of capability manipulation instructions, to be discussed in more detail shortly. The capability registers 116 may be implemented in the execution logic, or as part of the MMU implementing part of the memory access logic 108, or a separate dedicated register file. For practical purposes they would preferably be implemented on the same die as the execution logic and MMU.

The further capability registers 302 may be implemented as general-purpose capability registers that will be used explicitly as operands for capability instructions. E.g. in a system with full CHERI implementation, these registers will may be the same as those exposed for virtual capabilities.

General purpose capability registers are tightly coupled to the CPU's pipeline(s) and so must be implemented as part of the CPU. The system register will typically have write-through behaviour such that setting it will update corresponding state in the MMU.

FIG. 2A illustrates an example implementation of the physical memory space 202 of the physical memory device (s) 106. Note that FIG. 2A is only schematic and is not necessarily intended to imply that the physical address space 202 consists of a single range of contiguous addresses. E.g. it could represent the address space of more than one physical memory device, and/or a broken range of a given device with unusable regions.

The physical memory 106/202 takes the form of a tagged memory. That is, it comprises a plurality of words for storing data (i.e. actual data content or payload data), but also a respective tag bit concatenated with each word. The tag bit is asserted (e.g. set to 1) when the respective word is part of a capability, and is de-asserted (e.g. set to 0) when instead the word is usable for other data (payload). In such embodiments, the checking of a capability by the hardware-enforced mechanism implicitly comprises checking the tag bit, wherein each capability is only valid if the tag bit is asserted. In embodiments the tag bit is not addressable other than by executive code running in an executive mode. Further, if any of said words is loaded form memory, the tag bit is propagated with it. Such features help ensure that the capabilities act as unforgeable tokens of authority for granting access to their respective specified memory address ranges. This creates a strict provenance chain and makes the physical capabilities unforgeable.

The tags will be propagated through the cache hierarchy and into capability registers. In a full CHERI system, all memory must preserve tags, but in the present system it is sufficient for a subset of memory to preserve tags (though that limits the number of isolated regions that can be supported). Further, the linearity property is enforced by the guarantee that loads from memory to registers clear the tag bit. The simplest way in hardware of enforcing this is to require atomic exchange operations to move linear capabilities between registers and memory and to not propagate the tags for linear capabilities when normal load/store operations are performed.

Tagged memory is however not essential. As mentioned in the background section, capabilities are protected in memory, and hardware memory capability systems can do this in at least two ways. The first way is by restricting where capabilities can be stored in memory. Capabilities can be stored only in specific regions and everything in those regions is a capability or an explicit invalid capability value (typically zero). The CAP computer used this model, for example. The second way is by using some form of tagged memory, where a non-addressable bit is set when a valid capability is stored and cleared when any other data is stored to the same location. CHERI (and the M-Machine and some other systems) use this model. The system disclosed herein could support the former approach, if a specific region is marked within the address space executive as storing a capability table (though this would be a slightly weaker model because enter capabilities would then be forgeable).

FIG. 3 illustrates the capability registers 116. These may comprise a single root capability register 302, and a set of further capability registers 304, also referred to herein as the "general-purpose" capability registers. Note that FIG. 3 is schematic and does not exclude the possibility of a merged register file (where there is overlap between the general-purpose registers and capability registers: for example where there are 32 GPRs and 16 of them are 64 bits, 16 of them are 129 bits with the low bits being useable for integer operations).

A capability is a small data structure which at least specifies an address range to which it grants access. It may also include other parameters, such as the type or types of permission which it grants (e.g. read, write and/or execute).

Figure 6:
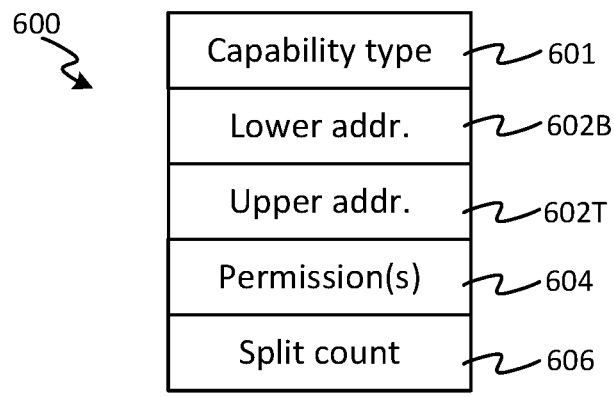
FIG. 6 is a schematic representation of an example a physical linear capability in accordance with embodiments disclosed herein.

FIG. 6 shows an example form that the data structure 600 of a capability may take in accordance with embodiments disclosed herein. The capability data structure 600 comprises at least a pair of fields 600 specifying an address range. Since the capabilities herein are physical capabilities, these specify a range from amongst the physical address space 202. In the illustrated example the address fields specify the range in terms of a lower address and an upper address of the address range. However they could alternatively specify the range in terms of a lower address and an additive offset, or an upper address and a subtractive offset, for example. However represented, this is the respective range of addresses in the physical address space 202 to which the respective capability grants access.

In embodiments the capability data structure 600 may also comprise one or more additional fields. For example, if the system supports different types of capability, in embodiments the capability data structure 600 may comprise a capability type field 601 for specifying a capability type of the respective capability. And/or, the capability data structure 600 may comprise a permissions field 406 for specifying one or more types of permission granted by the respective capability, e.g. read, write or execute.

The capability data structure 600 may also comprise a split count field 606 for the purpose of recording how many times the respective capability has been sharded. This will be discussed in more detail later.

A capability acts like a token or "bearer bond" for gaining access to the. Only a module of software that has possession of a given capability can access the physical address range specified by that capability. For a given software module to "have" the capability for the present purposes means that the capability is held in a storage location which that software module can access. This storage location could be a register, or another region of memory, or both. This will be discussed in more detail shortly.

With a linear capability, the token or "bond" is moved without a copy operation. The sharding operations may be considered an extension of the linearity concept, allowing a part of the capability to be extracted. This is analogous to the splitting of a capability by range or into different permission sets.

Figure 4:
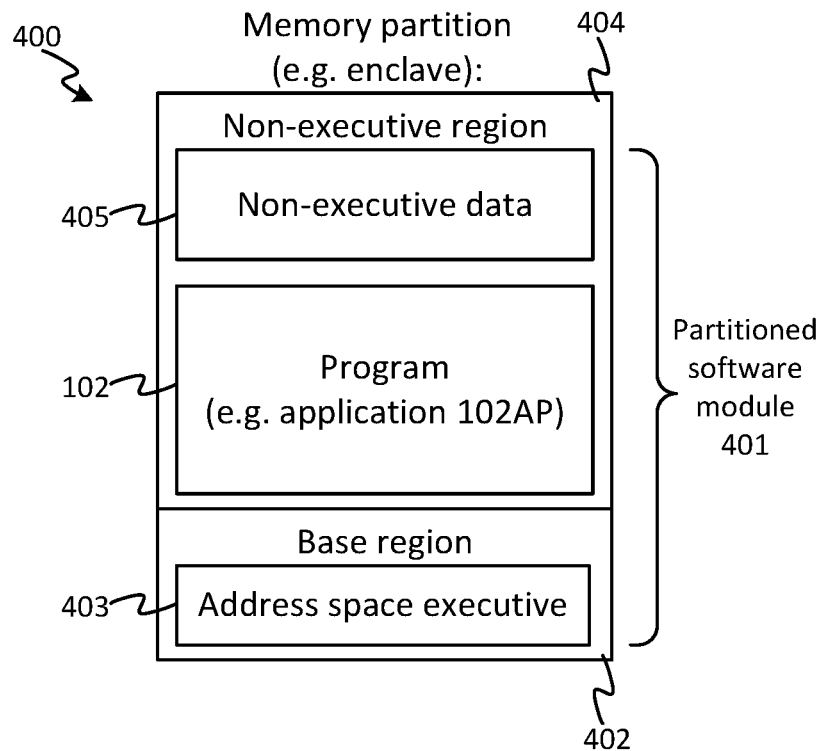
FIG. 4 is a schematic block diagram of an enclave or other such memory partition in accordance with embodiments disclosed herein.

According to the present disclosure, the physical memory space 202 is partitioned into a plurality of separate address space partitions 400. An example of such a partition 400 is illustrated in FIG. 4.

In embodiments, each partition 400 may comprise a respective base region 402 and a respective non-executive region 404 in the physical address space 202. Note that these regions need not necessarily be contiguous with one another in the physical address space 202, and nor need the internally contiguous. In embodiments the base region 402 may be a single range of continuous addresses, but this is not essential to all possible implementations. The non-executive region 404 may comprise a single range of contiguous addresses or multiple ranges that are non-contiguous with respect to one another. A respective capability grants access to each range.

The executive region 402 of each respective program 102 comprises a respective address space executive 403, which is a special portion of executive-level code for managing the partition 400. The non-executive region 404 can be used to store any respective non-executive data 405 and/or non-executive program code 102 that the developer wishes.

The executive region 402 is implemented in a region of memory that is isolated from everything else and can only be accessed by executive-level code running in a special executive mode of the execution logic 104. To create an executive, a complete capability to a region of memory must be presented (a complete capability meaning an exclusive capability, i.e. only one instance exists and it is not sharded, such that there is only one owner of the capability and that owner has exclusive access to the capability's address range). This guarantees that no other part of the system has access to that memory. This capability is then consumed and a (copyable) enter capability is created. When the executive is invoked, the root capability register will contain a capability that has the same rights as the original linear capability and a flag indicating that it is an executive. Software running in the region identified by that root capability is able to access memory in that region, software running elsewhere (in the extended region identified by the capability table) is not. This effectively adds another ring to the existing userspace/supervisor/hypervisor privilege levels.

The executive mode is operable to switch between an executive mode and a non-executive mode. Code running in the executive mode can perform certain actions, such as accessing the executive regions of memory, that the code running in any other privilege level cannot. This mode is a hardware setting of the execution unit. Upon start-up the execution logic begins by boot code in the executive mode. The boot code then hands over to the executive-level code 403 of the partition 400 of the lowest level in the stack 100, e.g. the hypervisor 102A in the case illustrated. This executive-level code can then jump to non-executive code 102, and in doing so the mode is switched to the non-executive mode. When the program 102 exits, the execution logic automatically jumps back to the executive code that launched the program and switches back to the executive mode.

Many existing architectures have a privileged mode referred to as the supervisor mode (or x86 calls it ring 0). In embodiments, the address space executive mode is distinct from existing privilege levels such as supervisor mode, and is used for code that manages a region of memory that contains software that will use one or more of the privilege levels. For example, an enclave would use only user mode, an isolated VM would use only user and supervisor mode, and a hypervisor running on a system with a trustzone-like isolation mechanism would use hypervisor, supervisor, and user modes.

Note that the "non-executive mode" simply refers to any mode other than the executive mode. In embodiments it may encompass multiple non-executive privilege levels, e.g. a supervisor or kernel mode and a user mode. All existing privilege levels still exist. The address space executive mode is largely orthogonal to the other privilege levels. The amount of code running in the address space executive mode is expected to be very small and do only a fraction of what a hypervisor or OS does (i.e. provide memory isolation and sharing, and a set of interfaces for securely configuring the sharing, very little else). The non-executive program 102 may refer to any non-executive program not running in the executive mode. This could be an application 102AP, an operating system 102OS or a hypervisor 102HV.

Together the non-executive data 405, non-executive program 102 and address-space executive 403 of each partition 400 form a partitioned module of software 401. The modules 401 comprising the different programs 102APi, 102APii, 102OS, 102HV, etc. can be kept secure from one another by the mechanism discussed below.

In embodiments, a partition 400 may have exclusive access to at least one secure region within the respective non-executive region 404, and shared access to the rest of the process's memory. Similarly, an isolated VM may have exclusive access to its own memory and shared access to parts that it uses for communication. In general, the system supports a single entity that has memory, parts of which are completely private, shared with a single other party, or shared with multiple other parties but not with all. A partition comprising at least some exclusive memory may be referred to as an "enclave", though note that this terminology is not always used consistently in the art.

In some cases a given partition 400 could be completely isolated, i.e. only the software module 401 within that partition 401 can access the physical address ranges of that partition and no software modules 401 from any other partitions 400 can access those physical address ranges. In other words, the partitions 400 are separate partitions of the physical memory 106/202 (non-overlapping address ranges). In practice however the system is likely to have a mixture of memory that is completely private to the environment and memory that is shared. Complete isolation may not be very useful because some mechanism is needed for communicating with the outside world and that typically involves at least a small amount of shared memory.

A given range of memory could be shared between a restricted subset of more than one software module 401, and/or different modules 401 could enjoy different levels of permission over the same region of memory (e.g. one can only read, and another can only write or can read and write, etc.). In general the term partition herein may be used to refer to any compartment or apportionment of the physical memory space 202, and does not in itself imply complete isolation of the whole memory range of the partition.

Note also, FIG. 4 shows a partition 400 that may be an enclave, but it does not explicitly illustrate an isolated VM in that it does not illustrate the notion of multiple privilege levels. It should be appreciated that multiple privilege levels may also be employed in embodiment's disclosed herein. This mechanism is orthogonal to the existing privilege mechanism in CPUs and so would allow an isolated region to have only userspace, userspace+supervisor, or even userspace+supervisor+hypervisor privilege levels.

Figure 5:
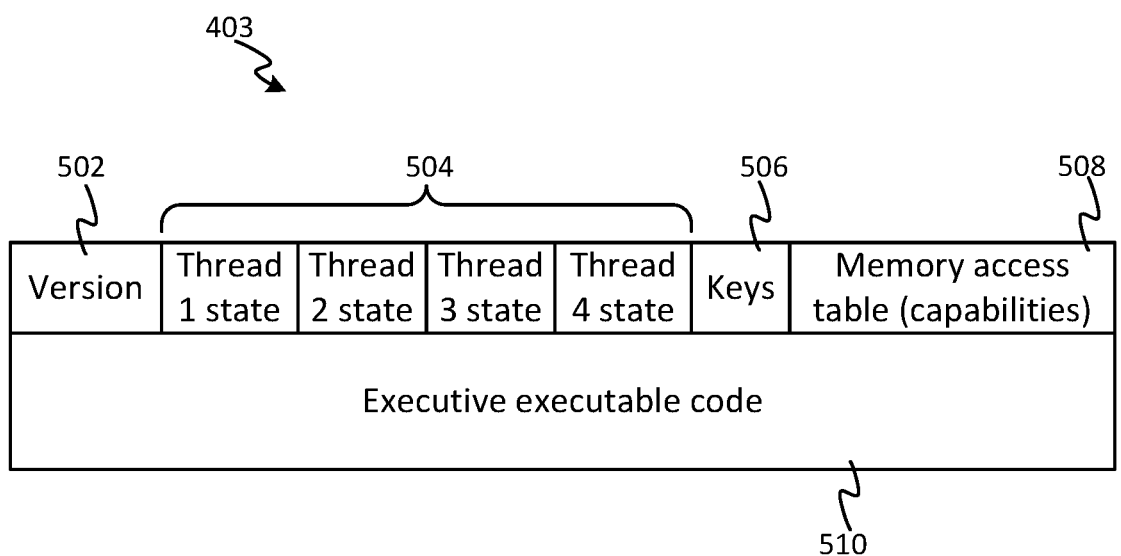
FIG. 5 is a schematic block diagram of an enclave executive in accordance with embodiments disclosed herein.

FIG. 5 illustrates an example data structure of the address space executive 403. This comprises a plurality of fields, including at least a memory access table 508 and a portion of executable executive code 510. The memory access table 508 is where one or more capabilities for the non-executive region 404 of the respective partition 400 are stored. The address space executive may optionally comprise one or more additional fields, such as a version field 502 for storing a version number of the address space executive, and/or a program state field 504 for storing a program state of the address space executive, and/or a keys field 506 for storing one or more keys required if the memory is encrypted and/or integrity protected. The program state could comprise an individual thread state for each of a plurality of threads. For the present purposes this does not necessarily imply the userspace notion of a thread and may be closer to the VM abstraction of a virtual CPU that a system inside the isolated region (for example, an OS) implements threads on top of.

The address space executive code 510 is responsible for managing the capabilities, including transferring capabilities between software modules 400. It may also be responsible for one or more additional functions such as a revocation policy, e.g. specifying whether capabilities can be revoked by the hypervisor 102HV or operating system 102OS.

In operation, consider that a portion of code—either a program 102 in the non-executive space 404 or the address space executive in the executive region 402—requests to access a target address in the virtual address space 204 (either directly, or in the form of a first tier "pseudo-physical" virtual address converted from a second tier virtual address). E.g. this could comprise executing a load instruction to load a value from the target address into a register, or to store a value to the target address from a register. In response, the memory access logic 108 automatically translates the target virtual address to a physical address in the physical address space, by reference to the page table 112. The memory address logic 108 then automatically checks whether access to the physical memory address is granted. If so, the memory access operation (e.g. load or store) is allowed to proceed. Otherwise it is not, and in embodiments an exception is raised.

The access will be allowed if either one of the following conditions is met: i) a capability covering the physical address is found in the root capability register 302 while the code performing the memory access operation is executing, or ii) a capability covering the physical address is found in the base region of the currently-executing software module 400 (where a capability covering a given physical address means a capability specifying a physical address range including that address). This assumes a direct correspondence between the root capability and the code that runs with address-space executive privilege, but that is not necessarily required (it merely simplifies some aspects of the implementation). Likewise, the requirement that linear capabilities never leave the memory assigned to the address space executive is to simplify the verification of the code and prevent capabilities from being accidentally destroyed, rather than being a core part of the model.

The check for the capability is performed (and the result of the check is enforced) by the memory access logic 108. The check may be implemented for instance by dedicated hardware circuity in the MMU, or by low-level trusted firmware or executive software, or a combination thereof (e.g. the hardware may be provided with a mechanism for triggering more executive-level software or firmware to run when an interrupt is raised). In embodiments all this is triggered in response to a single machine code instruction of the execution logic's instruction set, e.g. a single load or single store instruction. For efficiency, in embodiments the result of the check will also be cached in hardware (e.g. the TLB 114), irrespective of how it actually occurs.

The root capability in the root capability register 302 grants access to the base address region 402 containing the address space executive 403. The memory access table 508 in the address space executive 403 contains zero or more further capabilities that grant access to one or more further address ranges making up the respective non-executive region 404 (it could be that an isolated region consists solely of the software running in the base region 402 and running with address space executive privilege—not likely to be common, but it may be useful to have some lightweight trusted agents that run in this mode). When the address space executive 403 of one module of software 401 calls another module of software 401, then a domain transition is performed to transition from one partition 400 to another (e.g. the hypervisor calling the OS or the OS calling an application). On domain transition, the root capability is replaced in the root capability register 302 with the root capability of the address space executive 403 of the called software module 401. The call jumps to a point (e.g. a predetermined point) within the executable code 510 of the address space executive 403 of the called module 401, such that the new address space executive begins running. The address space executive 402 can then jump to any location in the respective program 102 in the non-executive region 404 based on having the corresponding capability or capabilities for that region in its respective memory access table 508. The address space executive 403 or non-executive program 102 can also access data 405 from anywhere in the non-executive region 404 based on having the corresponding capability or capabilities for that region in the respective memory access table 508.

Preferably, the instruction set of the execution logic 104 comprises one or more dedicated capability manipulation instructions, i.e. dedicated machine code instructions for modifying the physical capabilities and/or transferring capabilities between software modules 401. In embodiments, one, some or all of these instructions may be reserved for executive-level code run in the executive mode, so within a partition 400 they can only be used by the trusted address space executive 403 and not non-executive software 102. However that is not necessarily the case. Alternatively one, some or all may be unprivileged instructions but can be used only with valid capabilities and so, if the software stack maintains the invariant that linear capabilities are stored only in memory owned by address space executives then these instructions are implicitly useable only by executives, rather than explicitly.

The capability manipulation instructions may comprise any one, more or all of the following: a partition creating instruction (e.g. EnclaveCreate) for use in creating a partition; a partition call instruction (e.g. EnclaveCall) for calling the address space executive 403 in another partition; a capability sharding instruction (e.g. CShard) for sharding a source capability into two destination capabilities; a range splitting instruction (e.g. CSplitRange) for splitting a source capability into two destination capabilities with the source range split between them; a permission splitting capability (e.g. CExtractPerms) for splitting a source capability into two destination capabilities with different types of permission over the same range; and/or one or more capability combining instructions (e.g. CCombine) for recombining two sharded, range-split or permission split capabilities (this could be the same instruction type for all these or separate types for the different types of recombining). Alternatively one some architectures, such as those that wish to avoid microcode, any of the above operations (e.g. EnclaveCall) could be implemented as a multi-instruction sequence.

A capability can be transferred from the memory access table 508 of one software module 401 to that of another in a linear, thus modifying the size of the partition 400 of both of them. A linear transfer means one in which a capability is transferred from the partition 400 of one software module 401 to the partition 400 of a second software module 401 without remaining in the partition of the first. In the illustrated embodiments, this means transferring the capability from the memory access table 508 in the base region 402 of the first software module 401 to the memory access table 508 in the base region 402 of the second software module 401, without it remaining in the memory access table of the first.

A capability may also be sharded. Linearity is a property of how the capabilities are transferred (i.e. that move is permitted by copying is not), sharding is a property of the thing that is moved. Sharding defines an additional way of splitting a linear capability. A capability can be split (sharded) into two portions (shards), and possibly then further split into smaller shards. Both portions are linear: they can be moved, not copied. If a capability is split into two parts, another party that later receives both parts can reassembly the full capability. The linearity property of the sharded parts guarantees to them that no other entity retains copies of the capabilities. In between the initial split and final recombination, any number of split and combine operations may be performed but the linearity property must be respected for all of them.

One of the shards can be transferred linearly from the memory access table 508 of a first partition 400 to that of a second partition 400. Both the first and second (source and destination) partitions 400 then have one of the shards. Any software module 400 in possession of a shard (having it in its memory access table 508) covering the same address range will have access to that physical address range, i.e. so the memory range will be shared but only between a restricted number of modules 401 that have one of the capability shards.

According to one aspect disclosed herein, the sharding operation also implicitly modifies the split count value 606 to record that each resulting shard capability is a fraction of the original unsharded (i.e. exclusive) capability, and what fraction it is of the original exclusive capability. This split count enables sharded capabilities to be reassembled again later, such that exclusivity can be restored and the sharing of memory need not be indefinite or unfettered.

For instance in one possible encoding, considering an 8-bit split count field by way of example, this may use a 1-biased representation. I.e. so the representable values are 1-256 (there's no point in having a 0 fraction of a capability, because that has no meaning) and a value of 256 indicates complete ownership (not sharded at all), a value of 128 denotes owning half of the original capability, and so on such that a value of 1 indicates owning 1/256 of the original capability. In this encoding reassembly requires only addition (and splitting requires subtraction).

A number of operations may be allowed on capabilities. Linearity is a property of all of the operations that are allowed on linear capabilities: i.e. that no copies are made and that the outputs of any operation result in a set of capabilities that contain exactly the same rights as those held by the inputs.

A splitting operation preforms a splitting based on range or permissions to give two capabilities that have disjoint subsets of the rights of one initial capability. Sharding gives two capabilities that have the same rights as the original but with a smaller split fraction (the sum of the split fractions is the same as the original). Combining gives a single capability that has the sum of the rights held by both parts. Atomic exchange moves a pair of capabilities between a register and a memory location (if one is a null capability then this is equivalent to either a load or a store enforcing the linearity property). An EnclaveCreate consumes a complete capability (full split fraction, all permissions) and gives an enter capability, which then allows the system to reconstruct the full capability with the executive bit set in the root register. The executive bit prevents any software from moving this capability out of the root capability register until the enclave has been destroyed. Enclave destruction implicitly invalidates all enter capabilities for an enclave and reconstructs the complete capability to the memory. A revocation mechanism for enter capabilities exists and will be discussed in more detail later.

When sharded or split capabilities are recombined, the reassembled parts may be equal, but two unequal parts can also be recombined. Any split operation (whether via sharding, permission or rage splitting), can be reversed and if all split operations are reversed then the result will be the final capability.

As an optimization, in embodiments instances of the capabilities from the memory access table base region 508 in the base region 402, of at least the currently-executing module 400, may be held in the general purpose capability registers 304. The root capability register(s) 302 is/are used for base lookup. The further (general-purpose) capability registers 304 are used as places for the executive code to manipulate capabilities and as a place to store them when passing them between domains. The capabilities from the base region are not stored in these registers and memory at the same time. Rather, software may move capabilities between the base region (or, if the software policy allows it, other memory) and these registers. The further capability registers 304 that thus can hold capabilities, loaded from and stored to memory, for manipulation by the execution logic 104. However they do not hold duplicates at the same time as the memory, because duplication would violate the linearity property.

In embodiments the general-purpose capability registers 304 are used as the operands of the capability manipulation instructions which perform operations such as transferring from one module 401 to another, sharding a capability, spitting the address range of a capability between two new capabilities, and recombining capabilities.

In embodiments, the EnclaveCall instruction (or, rather, storing capabilities in registers 304 during an EnclaveCall) is the mechanism for linearly transferring capabilities between partitions, but every load, store, split or combine is also linear. EnclaveCall swaps the root capability and gives an enter capability to the previous one in a link register. It does not clear any other registers, so one module 401 load a capability from its memory access table 508 into a capability register and then perform an EnclaveCall. If it is desired to send more than one different, non-contiguous capabilities to an enclave or partition before calling it; then if the system has enough capability registers, the capabilities can all be placed as in-register arguments and then an EnclaveCall executed to call the target. If there are not enough registers, then multiple calls may be needed to pass all of the capabilities.

As an alternative or in additional to using EnclaveCall, other implementations could provide other mechanisms for performing a linear transfer of a capability, e.g. a dedicated linear transfer instruction for transferring a linear capability from one enclave/partition to another. To do this in a single instruction would preferably be microcoded. The receiver will typically wish to do something (decide whether and/or how to accept the capability), so to implement this would preferably involve a function call or the like. This could potentially also be done asynchronously (without any dedicated hardware support) by providing a capability to a buffer that's shared between two executives and using it as a ring buffer to store other capabilities in.

Figure 7:
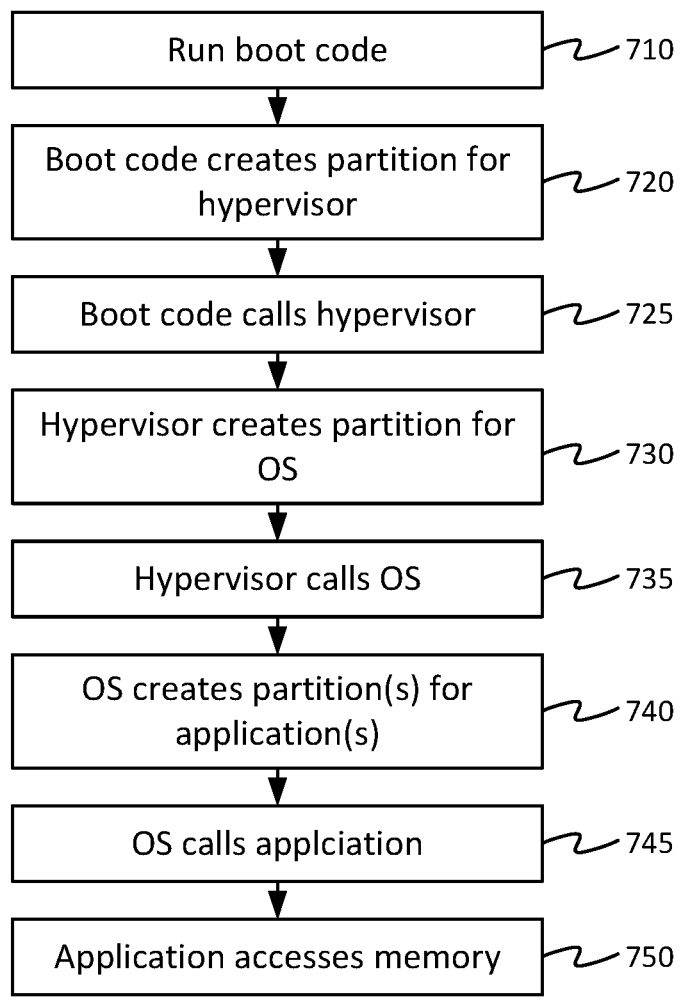
FIG. 7 is a flow chart of a method of partitioning memory in accordance with embodiments disclosed herein.

FIG. 7 is a flow chart showing a method of booting the system 100, and then partitioning the physical address space 202 and allocating corresponding capabilities between different software modules 401 running in the different partitions 400. This will be exemplified in terms of a scenario as shown in FIG. 1 where an operating system 102OS runs on a hypervisor 102HV and one or more applications 102AP run on the operating system. However it will be appreciated that the same principles can apply to other combinations of programs 102, e.g. without a hypervisor where the operating system 102OS is the lowest level program 102 in the stack 100.

At step 710 the method begins by running the boot code on the execution logic 104. The boot code is executive level code that runs in the executive space and initially owns one or more root original capabilities covering the entire physical address space 202 (or at least the entire protected address space if only part of the address space is protected by the capability mechanism).

At step 720, the boot code then creates a partition 400 for the lowest level program 102 in the stack 100, in this case the hypervisor 102HV. This creates the base region 402 and address space executive 403 for the hypervisor 102HV, and allocates a corresponding capability covering the base region 402. The boot code may also allocate one or more further capabilities to the memory access table 508 covering one or more non-executive regions for running non-executive code 102HV of the hypervisor.

At step 725, the boot code calls the software module 401 comprising the hypervisor 102HV. This comprises switching the root capability in the root capability register 302 to that of the hypervisor's base region 402, and by jumping to an address within the address space executive 403 of the hypervisor 102HV. The hypervisor's executive 403 can then jump to its non-executive code 102HV, and/or create and call to a partition for the operating system 102OS.

At step 730 the hypervisor's address space executive 403 creates a partition 400 for the operating system 102OS. This creates the base region 402 and address space executive 403 for operating system 102OS, and allocates a corresponding capability covering this new base region 402. The hypervisor's executive 403 may also allocate one or more further capabilities to the memory access table 508 of the operating system's executive 403, thus adding one or more non-executive regions for running non-executive code 102OS of the operating system.

At step 735, the hypervisor 102HV or its executive 403 calls the software module 401 comprising the operating system 102OS. This comprises switching the root capability in the root capability register 302 to that of the operating system's base region 402, and jumping to an address within the address space executive 403 of the operating system 102OS. The OS's executive 403 can then jump to its non-executive code 102OS, and/or create and call to partitions for one or more applications 102AP.

At step 740 the operating system's address space executive 403 creates a partition 400 for at least one application 102AP. This creates the base region 402 and address space executive 403 for the application 102AP, and allocates a corresponding capability covering this new base region 402. The operating system's executive 403 may also allocate one or more further capabilities to the memory access table 508 of the operating system's executive 403, thus adding one or more non-executive regions for running non-executive code 102OS of the operating system.

At step 740, the operating system 102OS or its executive 403 calls the software module 401 comprising the application 102AP. This comprises switching the root capability in the root capability register 302 to that of the application's base region 402, and by jumping to an address within the address space executive 403 of the application 102AP. The application's executive 403 can then jump to its non-executive code 102AP.

At step 750, the application 102AP can access data 405 from within its allocated non-executive space 404 based on having a corresponding capability for that address range in its memory access table (and in embodiments a capability register 304).

Note that FIG. 7 does not imply that all of these steps are necessarily required in all possible scenarios. They are required only if every level in the system (hypervisor, OS, and application) requires isolation. It is possible, for example, to start an executive for the OS and run the OS isolated from the hypervisor, but not enforce any isolation of applications from the OS. This is likely to be a common use case (e.g. a cloud customer trusts the OS that they deploy but does not trust the hypervisor provided by the cloud operator). Address space executives 403 are required only for components that do not wish to rely on a hierarchical trust relationship where they are strictly less trusted than the component that assigns them resources.

The following now describes in more detail some examples of the operations that may be performed on capabilities. It will be appreciated that these example details are given my way of illustration only and are not necessarily limiting.

As mentioned, the root capability is for the current address-space executive. On domain transition, it is replaced in the root capability register 302 with the target executive's capability. Domain transition is a call between two isolated address spaces. In embodiments it is the result of an EnclaveCall instruction. Note that a trusted hypervisor can call an OS (and an OS can call a trusted hypervisor), and a trusted OS can call an application and vice versa, without going via the executive. The cross-domain call is required only between mutually distrusting parties (e.g. a hypervisor and an isolated VM, an OS and a userspace enclave).

In embodiments, to set up a partition (e.g. enclave) 400 may involve a sequence of instructions. For instance, the high-level operations for bootstrapping may be:
i) load the initial software state into a region of physical memory,
ii) extract a physical capability to that region from the root capability using a sequence of one or more of the capability splitting instructions,
iii) issue an EnclaveCreate instruction with that capability, giving an "enter capability", and then
iv) issue an EnclaveCall instruction.

For subsequent isolated regions, a similar sequence may be executed but step ii) involves directly using one of the physical capabilities held in the address space executive's memory access table 508. EnclaveCreate takes a complete linear capability to a region and constructs the enter capability. In embodiments it also produces an initial attestation, which can be used to validate that the initial state of an executive is running trusted code.

An enter capability is a term from existing capability systems. It is a capability that grants the right to invoke (enter) a particular piece of code, but not to inspect it. An enter capability implements domain transition. Once an executive for an isolated address space is created, then some mechanism is required for invoking it. It is required to be able to hand out the rights to call into the executive, without handing out the rights to directly access any of its information. This is an enter capability. It can be used as the operand to an EnclaveCall. The hardware will check that it is valid and, if so, construct the enclave capability (a linear capability with a bit set to prevent it from being removed from the root capability register except during executive tear-down). Once enter capabilities exist, some mechanism is required for invalidating (revoking) them so that, when an executive is destroyed, the initial linear memory capability can be reconstructed without violating the linearity invariants. In embodiments, enter capabilities are not linear, they provide the mechanism that allows multiple isolated units to all invoke each other. In alternative embodiments enter capabilities could be linear, but they could also have a different revocation mechanism. Either way enter capabilities have some revocation mechanism. One possible revocation mechanism involves having an extra per-enclave tag bit and a revocation counter at the start of the executive. If non-executive code is not allowed to directly hold enter capabilities, then the same linearity mechanism could be used, though that would complicate the tear-down process (to destroy an isolated region, all enter capabilities for it would have to be recovered).

To call to a partition (e.g. enclave) 400, the EnclaveCall instruction acts like a jump and link register instruction. The caller is responsible for putting any arguments (including capabilities) in registers. The callee executive will typically have a dispatcher that will check the caller and some equivalent of a vtable index and then jump to the correct location.

To linearly transfer a capability from one partition (e.g. enclave) 400 to another, this may be implemented simply by a cross-domain call (EnclaveCall instruction) that has a linear capability in a register. Alternatively the possibility is not excluded to provide a separate enclave transfer instruction in the instruction set of the execution logic 104.

EnclaveCall takes an enter capability and:
i) Checks the enter capability is valid.
ii) Constructs an executive capability corresponding to the enter capability and install it in the root register.
iii) Takes the old value of the root register and,
   a. if it is an executive capability, construct an enter capability from it and put it in the capability link register, but
   b. if it is not an executive capability, place it directly in the capability link register.

Execution then resumes inside the target executive.

To shard a capability, the capability sharding instruction may for example take the form:
CShard $cd, $cs, $rs
where $cd is the capability destination register, $cs is the capability source register and $rs is an integer source register. This will deduct the value in $rs from the split fraction field in $cs, and construct a capability in $cd that was identical to the original value of $cs, with the split fraction field set to the value in $rs. If $rs is greater than the split share in $cs, it would give a null capability in $cs and the original capability in $cd (or the other way around—both are equivalent for the model).

Similarly, an instruction of the form:
CSplitRange $cd, $cs, $rs
will split $cs into two components, split according to the offset into the address range provided in the $rs register.

Another instruction of the form:
CExtractPerms $cd, $cs, $rs
may do the same thing to extract a set of permissions from $cs into $cd.

To recombine range-split or permission-split capabilities, in embodiments there may be a single CCombine instruction, of the form:
CCombine $cd, $cs1, $cs2
This will check that $cs1 and $cs2 are either adjacent and with the same permissions and split fractions, identical range and permissions but different split fractions, or identical range and split counts but different permissions, then the values in $cs1 and $cs2 will be replaced with null and the combined capability will be placed in $cd.

To reassemble a sharded capability, this may also be done with a single CCombine instruction, or with separate instructions for combining permissions, split counts, and ranges.

The capability manipulation operations are atomic. That is, a thread cannot perform only a partial update to a capability before switching to another thread. I.e. moving or modifying a capability is an indivisible operation. Taking an interrupt in the middle of a capability operation, for example, should not allow partial state to be observed. Preferably this is enforced in hardware.

A mechanism may also be provided for tearing down a partition (e.g. enclave) 400. The policies for allowing this may be specified in the address space executives 403.

In accordance with the various possibilities discussed above, there is thus provided a set of extensions to an architecture that provides CHERI-like capabilities that will allow partitions such as SGX-like enclaves. SGX and CHERI both facilitate compartmentalisation but with very different threat models. SGX assumes a trusted application attempting to protect itself from an untrusted OS and/or hypervisor. CHERI assumes mutually distrusting components of an application attempting to protect themselves from each other, running atop a trusted OS. It would be desirable to make it possible for applications to simultaneously protect against both. The present disclosure provides various embodiments for achieving this.

Some further example implementation details are now set out below, again by way of illustration only.

To recap, a capability grants the rights to an address range. In the existing CHERI work, it grants the rights to a range of virtual memory and can therefore be used in places where the program has a concept of a virtual address (most commonly as the underlying implementation for the source-language concept of a pointer). When a capability grants access to a range of physical memory it must be used in places where the software has a notion of a physical address, for example in page tables and similar structures.

A linear capability to physical memory is the token the grants exclusive access to a range of physical memory. The system code (for example, the operating system kernel) responsible for defining the virtual to physical translation will define page table entries that refer to this capability. There are at least two possible mechanisms for implementing this.

As a first possibility, the capabilities are stored in a structured form by the address space executive. The OS updates traditional page tables to refer to a physical address and an extra stage at the end of the page table walk to inspect this structure and validate that capabilities to the represented address range are held by the address space executive for the currently executing component.

As the second possibility, capabilities are stored in a flat table by the address space executive and the leaf page table entries contain an index into this table and an offset within that capability. The page table walker then has a simpler extra step to check that this is a valid capability and that the offset in the page table is within the specified range. This approach allows arbitrary levels of delegation (i.e. the equivalent of nested virtualisation) with lower overheads than a single level of virtualisation in current implementations.

The first possibility is more complex but does not require the OS to be modified to be aware of the mechanism. The second possibility does require the OS to be modified to be aware of the mechanism, but has the upside of lower complexity.

The address space executive is code that is trusted by all privilege levels for the code that it directly manages. Malicious software running in an executive many not violate the isolation guarantees enforced by the hardware. Individual executives may decide whether or not to trust other executives based on their attestation quotes. If an executive fails to disable interrupts then it may lose its own capabilities, but it can't steal anyone else's. If an executive receiving a capability doesn't perform the correct TLB invalidations then the sending region may be (temporarily) able to access the memory but, again, the buggy enclave can compromise only its own security. The hypervisor trusts any running enclaves for some availability guarantees (i.e. that they won't accidentally destroy capabilities, leaving the system unable to access some memory until a reboot).

This risk is mitigated by restricting which entities in the system can create new executives, so that lower-level software (boot firmware and hypervisor, for example) can restrict the set of allowed executives to a small set that enforce specific policies. This is done in concert with an attestation mechanism (see below).

The address space executive may also be responsible for ensuring some invariants, such as that all updates to the capability table are performed safely (interrupts disabled so capabilities in registers aren't accidentally spilled by code that doesn't know how to preserve them, broadcast TLB invalidates to ensure that there are no stale references to the owned set of capabilities in other parts of the system).

Sharding adds a controlled sharing mechanism to this. The same capability checks are performed by the page table walker when installing TLB entries but now two address space executives can communicate that fact that, between them, they can account for all references to a page and so it is shared by them but not by any other entities in the system. For example, a shielded VM and a userspace enclave may share pages that the hypervisor cannot see.

Capabilities are stored in memory and in capability registers. They are protected by a tag bit in both (the tag bit is not addressable. It can be queried for a capability register and cleared, but not set (and not be cleared for a linear capability). The linearity guarantee is enforced by allowing only an atomic exchange operation to move capabilities between registers and memory.

The hardware enforces a strict provenance tree for all kinds of capabilities: capabilities cannot be materialised from nothing, they can be constructed only by permitted operations on an existing capability. The set of operations for linear capabilities is slightly different because all operations are destructive: they can be split and combined, but doing so destroys the original, similarly they can be moved between registers and memory but not copied.

Turning to possible implementations of the system diagram shown in FIG. 1, the page table 112 is preferably stored in memory. In principle it could be implemented in hardware or a register file though for uses cases it will be a large data structure and an implementation other than in memory may not be practical. There are a variety of different possible implementations for the data structure of the page table 112, such as a flat table look-up, tree, etc. There are, roughly speaking, two mechanisms used by MMUs (in which at least part of the memory access logic 108 may be implemented).

The first uses a software-managed TLB 114. These are used in MIPS and earlier SPARC (newer SPARC is a hybrid). When the CPU encounters a TLB miss, it delivers an exception and some system code installs the new TLB entry. An implementation of this idea with a software TLB would deliver the exception into the address space executive, which would issue a TLB fill instruction presenting the (physical) address in memory of a linear capability. The CPU would then check that the physical address was within the executive (by checking it against the bounds in the address space executive capability register), load the capability, and then install the TLB entry.

The second category of MMU mechanism uses a hardware-managed TLB 114. This defines a data structure (typically a page table, though there are some other variants) that provides a partial mapping from a virtual to physical address space. When the CPU encounters a miss in the TLB, a dedicated hardware state machine walks the data structure to find the entry to insert into the TLB. If the hardware page table walker fails to find an entry then it delivers an exception, which allows software to add missing entries in the page table and restart the walk. In systems that support virtualisation, there are typically two levels of page tables. One, managed by the guest OS translates from virtual addresses to pseudo-physical addresses. The second, managed by the hypervisor, translates between pseudo-physical and physical addresses. On a TLB miss, the page table walker will walk both and combine them to give a virtual to physical mapping. Both layers can have entries missing, and the exception is delivered to the OS or the hypervisor, depending on which layer is missing the entry. This allows both the OS and the hypervisor to perform swapping independently. For systems with a hardware-managed TLB, there are three options.

In the first option for a hardware managed TLB, the software running inside the isolated region is aware of the isolation mechanism. In this case, the address space executive manages a simple indexed data structure (e.g. an array) of physical capabilities and the software inside the region maintains a set of page tables (or equivalent). In traditional page tables, the last hop provides a physical address of the start of the page and a set of permissions. In this model; however, the last step is an index into the data structure managed by the translation. The page tables are untrusted, from the perspective of the security model: only the last check (of the capability, owned by the executive and referred to from this table) is important. Note that this model may involve an additional mechanism for address protection of the page tables themselves, for example an explicitly managed TLB entry or register that provides a capability to the entire memory range used by the current page table, or a simpler table managed by the enclave executive for use during page table walks.

In the second option for a hardware managed TLB, the software running inside the isolated region is not aware of the isolation mechanism (or, at least, the part that manages address translation is not). This code manages some untrusted page tables that, as with a normal VM, map from virtual to pseudo-physical addresses. The executive manages a mapping from pseudo-physical to physical. The last entry in the second-level translation is the capability to the memory and this is checked on TLB fill.

For the userspace enclave model, the third option is a slight variation of the second option. This variation has a single-level page table managed by the executive for the enclave and provides some interfaces to the OS for adding mappings of untrusted memory. From the hardware perspective, this is identical to the second option, the only difference being that the software running in the enclave executive has some interfaces that allow some pages to be delegated exclusively and some to be delegated as shared regions and external APIs to allow the OS update the page tables for the shared regions.

In embodiments capabilities are held in registers 302, 304, but are also part of the executive 403 which is stored in memory 106.

Registers are an architectural abstraction, whilst the TLB 114 is (mostly) a microarchitectural implementation detail. The capability registers are used to explicitly load and store capabilities. In this model, they are used primarily by the software running inside the address space executive, to manipulate the data structures that the MMU will inspect to determine whether entries are valid. The TLB responds to explicit invalidations (i.e. 'remove the address translation for this capability'). With a hardware-managed TLB, it is implicitly filled by the page-table walker (in a software-managed TLB it is explicitly filled in response to an interrupt).

In principle this model could be implemented without a TLB 114, but it would be much slower. The interactions with the TLB are a notable part of the design of the preferred embodiments.

The root capability register 302 is a system registers. A system register, also known as a 'machine-specific register' or a 'hardware register' is a register that is not part of the general-purpose register set. The root capability system register 302 is provided because no resource can be accessed unless a capability is presented for that resource. Because capabilities are both stored in memory and grant access to memory, there needs to be some mechanism for bootstrapping access. Embodiments therefore use at least one register 302 to contain a capability that identifies (and grants access to) the executive, which contains the other capabilities that are useable by a specific isolated region.(one register is sufficient, but more than one may be convenient for some implementations, for example to explicitly separate the executive's code, data, and capability table). In a software-managed TLB system, this capability identifies the region to which exceptions will be delivered on TLB miss. In a hardware-managed TLB system, this capability identifies the region that the page-table walker may inspect when trying to perform TLB fills.

On system startup, before entering the first address-space executive, any second-level translation is disabled and all memory accesses are simply checked against this capability. There is a mechanism to bootstrap the first address-space executive to manage the capabilities. This comprises:
 i) Loading the code and initial data structures for the address space executive into a region of the address space,
 ii) Carving out that region from the initial capability, and
 iii) Launching the address-space executive and providing it with the capability to the rest of memory.

An EnclaveCall instruction will provide one of two things to the callee from the caller's root capability (either in a system register or a general-purpose capability register):
 If the root capability is an address space executive capability, then the callee will receive an enter capability to that enclave.
 If the root capability is a linear physical capability, then the callee will receive that capability.

In a system with a TrustZone-like abstraction, this would be done by the boot firmware, which would then create address-space executives for the hypervisor and the TEE.

The MMU is responsible for enforcing all of these guarantees, though the root capability is stored in a system register that is not usually thought of as part of the MMU.

Logically it is intended to be read by the MMU. Physically, it may be stored in the MMU with a write to that architectural register being an implicit message to the MMU.

In operation, a capability is owned by a software module 401 if the capability is either in a register while that software module is running or is in memory reachable by the software module. The memory reachable by the software component is the transitive closure of the capabilities reachable from the root capability register.

The root capability exists to provide the root access. For example, in a system with a hardware-managed TLB, using single-level translation managed by the address-space executive:

i) isolated software reads virtual address X;
ii) the TLB has no mapping from address X;
iii) the page-table walker inspects the root capability to discover the location of the enclave executive;
iv) the page-table walker walks down the page table (typically a tree), checking that each entry is within the region identified by the root capability;
v) at the leaf node, the page-table walker finds a capability;
vi) the page-table walker inserts a TLB entry from the virtual page containing address X to the physical page identified by the capability, with the permissions identified in that capability; and then
vii) the load instruction succeeds.

If any of the capability checks fail, then the CPU will deliver an exception to the address space executive, which may then forward it to another executive.

This is somewhat more complex in the case where there are page tables are in the enclave. In this case, each page table access will require a more complex capability check. For example, in the fully nested paging approach, each entry in the page table is in a pseudo-physical address space and will need to run this sequence of operations to check the access (this is how nested paging works on current CPUs, with the addition of the capability check at the final layer).

The root capability is for the current address-space executive. On domain transition, it is replaced with the target executive's capability. It cannot then be extracted except via enclave tear-down (see below). Once an enter capability has been created, any code that holds a copy of that capability can call the enclave. The address space executive will explicitly convert its enclave capability to a normal linear physical capability and pass it to another executive during enclave destruction.

Every software module 401 runs its own partition (e.g. enclave) 400, which is a memory address subspace comprising a base region 402 and a non-executive region 404. The base region comprises at least the executive for the respective software component. The software component itself (e.g. the application) is stored in the non-executive region 404.

To begin with only the hypervisor is running and owns all the address space. To allow another isolated component to run, the hypervisor creates a respective base region for it in memory and populates this with a respective executive. The base region gets special protection from being modified. This is roughly analogous to the privileged/unprivileged mode separation in current CPUs. The region identified by the root capability can be modified only by code running in the executive mode, which is contained within that region and may be entered from non-executive code only via an explicit entry point.

To set up and run a partition (e.g. enclave), this involves the hypervisor or OS executing an EnclaveCreate instruction. The EnclaveCreate instruction turns a linear physical capability into an enter capability. This is a destructive operation, consuming the linear capability (and requires that the capability is not sharded—i.e. that it has exclusive ownership of the memory and all permissions). Initially, only the entity that created the enclave will hold a copy of the enter capability and so only that entity can call it. Copies of the enter capability can be delegated elsewhere. Permission to create an enclave is granted if either:

the root capability is a linear physical capability, or
the root capability is an address-space executive capability and the currently executing software is in executive mode.

This pair of restrictions allows the first executive to enforce a policy on all subsequent executives.

Another, non-contiguous address space can later be added to the enclave/partition. To do this another software component (the hypervisor or another component such as the OS or another app) gives the partition/enclave in question one of its capabilities. This is a simple EnclaveCall, passing the delegated capabilities in general-purpose capability registers. This involves an exchange operation to load them from the enclave executive that owns them. If the caller wishes to share memory, then the caller will shard the capability before passing it to the other enclave.

The clear separation between simple hardware mechanisms and (potentially) complex software policies is another notable part of this design.

The enter capability for the target is the operand for the EnclaveCall instruction. This causes execution to branch to a predetermined address of the executive of the destination enclave/partition. In embodiments it will always jump to a specific fixed address in the executive. In some other embodiments, it may take an integer operand and jump to an entry point identified by that index, as a performance optimisation. Either way, the executive may then decide to build thread-like abstractions on top, or simply acquire a mutex, or fail to acquire a mutex and return.

The executive code is now running. It can then jump to the non-executive region including any non-contiguous space in order to run the respective software component (e.g. OS or application). In some implementations it may be beneficial to have an explicit instruction for jumping out of the executive.

Destroying an enclave is referred to as "teardown". Enclave teardown relies on a trusted entry point in the enclave executive. This may only be invoked by one of a small set of enter capabilities provided during enclave creation, typically only the hypervisor.

As mentioned, once enter capabilities exist, some mechanism is required for invalidating (revoking) them so that, when an executive is destroyed, the initial linear memory capability can be reconstructed without violating the linearity invariants. This could be built on top of the linear mechanism, so enter capabilities are linear and shardable, but that is not necessarily ideal for two reasons. First, because it limits the number of things that can invoke an executive to the number of shards that the system supports. If every VM wants to be able to invoke the hypervisor then every VM will need an enter capability to the hypervisor. With an 8-bit shard count, this limits you to 256 VMs. The second issue is that, when an executive is torn down, the only way to invalidate the linear capabilities is to go and collect them all. This requires a lot of communication to identify all of the places where the linear capabilities have ended up and hand them back.

In the preferred design therefore, revocation is implemented by a unique number stored in both the enter capability and at the start of the executive in memory. An enter capability is valid only if that number matches, so all enter capabilities can be invalidated (revoked) by changing that number memory. There is also a tag check. Without the tag check, it would be possible to construct a region of memory that the system believes is an executive and reuse an existing enter capability, constructing a duplicate linear capability in the process and violating the system's invariants. The start of the enclave has a coarse-grained (for example, one per page) tag indicating that it is the start of an executive.

Therefore one can tear down an executive by incrementing the counter value, which invalidates all enter capabilities, force all other cores running in that executive to terminate, and then clear the enclave bit in the register and EnclaveCall out (which will pass the current root capability in the capability link register as a normal physical capability).

To destroy an enclave in this design, the tag bit will be cleared to invalidate any existing enter capabilities from being invoked, while simultaneously ensuring that exactly one thread is active. This is sequenced by invoking the teardown entry point in the enclave. This invokes enclave executive code that will first clear the tag, ensuring that no cores that are not already running enclave code can do so. It will then send an IPI to all other cores running enclave code, requiring that they invoke the hypervisor. Once all other running threads have notified the teardown thread that they have exited, the teardown thread will zero all physical memory associated with the enclave, clear the enclave bit in its base physical capability, and finally invoke the hypervisor.

Embodiments may also employ an attestation mechanism. When the hypervisor populates the executive region 402 with the code of the enclave executive, this code is trusted by both the hypervisor and the enclave. Nothing in the enclave base region can be modified after enclave creation by any code other than that resident in this section. The hypervisor's trust comes from the fact that it provides this code. The enclave owner trusts this code because it is part of an attestation quote and so can be verified to be the agreed enclave executive image. This code takes the place of a large amount of unverified secret microcode in SGX.

The system may perform attestation as a two-stage process. The hardware (microcode or a small coprocessor) will produce an attestation quote for the per-enclave executive image, specifically stating that it has created an enclave at a specific address, with a specific version, and that it is running an executive with a specific hash. For remote attestation, this will also include a signature of a public key generated by the enclave executive. This is not needed for local attestation because the base address of an enclave and its version are embedded in the entry capability.

The enclave executive code, because it runs with interrupts disabled and interposes on all entry and exit events, can then generate subsequent attestation quotes for software running inside an enclave.

It will be appreciated that the above embodiments have been described by way of example only.

More generally, the present disclosure relates to a system comprising, execution logic comprising one or more execution units, memory comprising one or more memory units; and memory access logic for looking-up a mapping between a physical address space of the memory and a virtual address space. The execution logic is arranged to run a plurality of software modules each in a respective partition of the physical address space, including to execute a memory access operation performed by a currently-executing one of said software modules, the memory access operation specifying a virtual address in the virtual address range as a target of the memory access operation. The memory access logic is configured to perform operations of: looking-up a physical address in the physical address space mapped to the virtual address, checking whether a capability granting access to said physical address is found in a storage location to which the currently-executing software module has access, and on condition thereof, granting access to said physical address for performing said memory access operation.

A storage location to which the currently-executing software module has access may be a capability register which currently-executing code can access, or a region in the currently-executing module's respective partition of memory.

Each capability specifies a respective region of the physical address space to which the capability grants access. In embodiments, at least one of the capabilities grants exclusive access to its specified address range.

The memory access logic may be implemented in dedicated hardware circuitry, in firmware, or in low-level software running in executive space, or any combination of these.

In embodiments, if the access is not granted, the execution logic may trigger an exception.

The memory access operation may for example be a load operation for loading a value from the target address, or a store operation for storing a value to the target address, or an instruction fetch operation for fetching an instruction to be executed by the execution logic from the target address.

According to a first aspect of the present disclosure, the execution logic is further configured to perform a linear capability transfer operation which transfers one of the capabilities from the partition of a first of said software modules to the partition of a second of said software modules without retaining it in the partition of the first.

According to a second, alternative or additional aspect of the present disclosure, the execution unit is configured to perform a sharding operation whereby one of the capabilities is divided into at least two instances, and the execution unit is further configured to perform a shard recombination operation whereby the instances are recombined.

To implement this, in embodiments at least one of the capabilities may comprise a respective split count value; wherein in the sharding operation the division is recorded in the respective split count value of each instance; and wherein the recombination is based on the respective split count values of the instances, and the reduction in the number of instances is recorded in the respective split count value of the recombined capability.

In embodiments the execution logic is configured not to allow any capability to be divided more than a maximum predetermined number of times.

In embodiments, a source one of said software modules may transfer one of the sharded instances from the partition of the source software module to the partition of a destination one of said software modules. This transfer may be linear. The other of the instances may be retained in the partition of the source module, or transferred to the partitions yet another of the software modules. This transfer may again me linear. To enable recombination, the instances may all be transferred back to the partition of a same one of the software modules. In embodiments all transfers of the sharded instances may be linear.

In embodiments the capability transferred by said linear capability operation may be one of said sharded instances.

In embodiments, the destination module may inspect the split count value to determine whether or not it has exclusive access to the respective address range, and/or to determine how many other instances of the respective capability are in circulation.

Any one, more or all of the following embodiments may apply to either the first or second aspect.

In embodiments, at least one of the software modules may comprise an application running on an operating system. In embodiments, at least one of the software modules may comprises an operating system upon which one or more applications are run, e.g. one or more others of said software modules. In embodiments, at least one of the software modules may comprise a hypervisor upon which at least one operating system is run, e.g. which may again also be one of said software modules.

Note that in the case of a three-tier stack of application, operating system and hypervisor (the application(s) running on the OS and the OS running on the hypervisor), then when the currently-executing software module is one of the applications, the mapping of the virtual address to the physical address may be via a pseudo-physical address. In other words, the currently-executing application specifies the virtual address, the operating system converts to a pseudo-physical address, and the memory access logic performs said determination of the mapping by mapping from the pseudo-physical address to the (true) physical address.

Each respective software module has access to the physical address ranged of its respective partition. As the capabilities both grant access to memory and are stored in memory, then a mechanism may be provided for bootstrapping the access. There are a number of possible mechanisms for this that may be used alone individually or more preferably together.

For instance, in embodiments each of the partitions may comprise a respective base region, and the memory access logic may be configured to perform said checking at least by: checking whether a capability granting access to said physical address is found in the base region of the currently-executing software module.

In embodiments, the base region of each software module may be implemented in a protected executive region of said memory, only accessible by executive-level code run in a privileged executive mode of the execution logic.

In embodiments, each of the partitions may comprise a respective further region of the physical address space in addition to the base region, wherein the capabilities in the respective base region grant access to the respective further region.

In embodiments, each of the software modules may comprise a respective address space executive, being a portion of executable executive code stored in, and fetched from, the respective base region of the respective software module.

In embodiments, each of the software modules may further comprise a respective program, other than the address space executive, stored in and fetched from the respective further region of the respective partition.

The program of each module could for example be an application, an operating system or hypervisor (or part thereof).

The capabilities in each of said base regions may for example be stored in the form of a memory access table.

Said checking of the base region may comprise checking the memory access table of the currently-executing software module.

In embodiments, the system may comprise at least one root capability register for storing a root capability of the currently executing software component. The memory access logic may be configured to perform said checking at least by checking whether a capability granting access to said physical memory address is found in the root capability register.

In embodiments, the root capability may grant access to the base region of the currently-executing software module.

In embodiments, the memory access logic may be configured to perform said checking by: checking whether the capability granting access to said physical memory address is found in either of the root capability register or the base region of the currently-executing software module, and granting access on condition of being found in either.

In embodiments, a calling one of said software modules may be configured to perform a calling operation to call another, callee one of said software modules, and in doing so to perform a domain transition which switches the root capability in said root capability register from the root capability of the calling software module to the root capability of the callee software module.

Due to the disclosed system of capabilities, neither the calling software module nor the callee software module will have access to the other's internal state (i.e. the data or code in other's partition).

The calling software module may for example be said first software module and the callee software component may be said second software module.

In embodiments, said calling may be performed by the address space executive of the calling software module. And/or, said calling may comprise jumping to the address space executive of the callee software module. In some such embodiments, said jumping may comprise jumping to a predetermined point in the address space executive of the callee module, e.g. to a predetermined instruction address in the base region. Alternatively the point to jump to could be specified.

The address space executive of the callee module, once called, may subsequently jump to the respective program in the respective further region of the partition.

In embodiments, before said calling, the calling software module or another of said software components may be configured to initially create one of said partitions (e.g. enclave) in which to run the callee software component by setting up the base region of the callee software component. The creation may be performed by the address space executive of said calling or other software module.

In embodiments, each capability may specify one or more types of permission: read, write, and/or execute. If the memory access operation is a load operation then the grant of access to the physical address is further conditional on the permission type being read. If the memory access operation is a store operation then the grant of access to the physical address is further conditional on the permission type being write. If the memory access operation is an instruction fetch or branch operation then the grant of access to the physical address is further conditional on the permission type being execute.

As an alternative or additional feature to sharding, in further embodiments the execution logic may be configured to perform a range-split operation whereby: a parent capability in the partition of one software module (e.g. said first or said source module), specifying a larger address range, is divided into two child capabilities specifying smaller address ranges being exclusive fragments of the larger address range. At least one of the child capabilities may be transferred to the partition of another, recipient one of the software modules (e.g. said second or said destination module). This transfer could be implemented either in a linear or sharded manner. In some such embodiments, the execution logic may be configured to perform a range recombination operation whereby the child capabilities are recombined back into a recombined capability with the larger range. The recombined capability may be placed in the partition of the initial software module, the recipient, or a further one of the software modules.

The execution logic may be configured to execute machine code instructions each being an instance of a plurality of instruction types defined in an instruction set of the execution logic, In embodiments, the instruction set may comprise one or more memory access instruction types, and said memory access operation and said operations of the memory access logic may be invoked by a single instance of a single one of said memory access instructions.

Alternatively or additionally, the instruction set may comprise one or more capability manipulation instruction types.

In some such embodiments, said linear capability transfer operation may be invoked at least in part by one or more instances of one or more of said capability manipulation instruction types.

E.g. the memory access instruction may be a single load instruction, a single store instruction or a single instruction fetch instruction.

In further alternative or additional embodiments, said sharding operation may be invoked at least in part by one or more instances of one or more of said capability manipulation instruction types.

In embodiments said shard recombination operation may be invoked at least in part by one or more instances of one or more of said capability manipulation instruction types.

In embodiments said calling may be invoked at least in part by one or more instances of one or more of said capability manipulation instruction types.

In embodiments said split-range operation may be invoked at least in part by one or more instances of one or more of said capability manipulation instruction types.

In embodiments said range recombination operation may be invoked at least in part by one or more instances of one or more of said capability manipulation instruction types.

In embodiments, one or more of the capability manipulation instructions may take an indication of one or more of said capability registers an operand.

In further embodiments, the system may comprise a plurality of further capability registers for holding capabilities loaded from the base region of at least the currently-executing software module. The address space executive may be arranged to use the further capability registers to store capabilities upon domain transition, and/or to use the further capability registers as operands of one or more of the capability manipulation instruction types.

In such embodiments, a given capability may be loaded from the base region to one of the further capability registers, and subsequently stored back to the base region, but without being maintained in both the capability register and the base region at the same time.

In yet further, embodiments, the memory is divided into a plurality of words for storing data, and comprises a respective tag bit connected with each word. The tag bit is arranged to be asserted when the respective word is part of a capability and de-asserted when instead the word is usable for other data. In such embodiments, said checking may comprises checking the tag bit, wherein each capability is only valid if the tag bit is asserted. And/or, in embodiments the tag bit is not addressable other than by executive code running in the executive mode. And/or, if any of said words is loaded from memory, the tag bit is propagated with it.

According to another aspect of the present disclosure, there is provided a method of operating the system according to any of the statements made above.

According to another aspect, there is provided software embodied on a computer readable medium or media, for execution on the system according to any of the statements made above, the software comprising one or more of said software modules, the one or more software modules including instructions for performing at least one instance of the memory access operation and at least one instance of the linear capability transfer operation.

Other variants or use cases of the disclosed techniques may become apparent to the person skilled in the art once given the disclosure herein. The scope of the disclosure is not limited by the described embodiments but only by the accompanying claims.

The invention claimed is:

1. A system comprising:
   execution logic comprising an execution unit;
   memory comprising a memory unit; and
   memory access logic for looking-up a mapping between a physical address space of the memory and a virtual address space;
   wherein the execution logic is arranged to run software modules each in a respective partition of the physical address space, including to execute a memory access operation performed by a currently-executing one of the software modules, the memory access operation specifying a virtual address in a virtual address range as a target of the memory access operation;
   the memory access logic is configured to perform operations of:
   looking-up a physical address in the physical address space mapped to the virtual address,
   confirming that a capability granting access to the physical address is found in a storage location to which the currently-executing software module has access, and
   granting access to the physical address for performing the memory access operation;
   the capability comprises a respective split count value; and
   the execution unit is configured to perform:
   a sharding operation whereby the capability is divided into at least two instances, and the division is recorded in the respective split count value of each instance; and
   a shard recombination operation whereby the instances are recombined into the capability based on the respective split count values, and a reduction in a number of instances is recorded in the respective split count value of the recombined capability.

2. The system of claim 1, wherein the execution logic is configured so as, based on the respective split count value, not to allow the capability to be divided more than a maximum number of times by instances of the sharding operation.

3. The system of claim 1, wherein the execution logic is further configured to perform a linear capability transfer operation which transfers one of the instances from the partition of a first of the software modules to the partition of a second of the software modules without retaining that transferred instance in the partition of the first.

4. The system of claim 1, wherein each of the partitions comprises a respective base region, and the memory access logic is configured to perform the confirming at least by: confirming whether a capability granting access to the physical address is found in the respective base region of the currently-executing software module.

5. The system of claim 4, wherein the respective base region of each software module is implemented in a protected executive region of the memory, only accessible by executive-level code run in a privileged executive mode of the execution logic.

6. The system of claim 4, wherein each of the partitions comprises a respective further region of the physical address space in addition to the respective base region, wherein the capability in the respective base region grants access to the respective further region.

7. The system of claim 4, wherein each of the software modules comprises a respective address space executive, being a portion of executable executive code stored in, and fetched from, the respective base region of the respective software module.

8. The system of claim 7, wherein each of the partitions comprises a respective further region of the physical address space in addition to the respective base region, wherein the capability in the respective base region grants access to the respective further region, wherein each of the software modules further comprises a respective program, other than the respective address space executive, stored in and fetched from the respective further region of the respective partition.

9. The system of claim 1, comprising:
a root capability register for storing a root capability of the currently executing software module; and
the memory access logic is configured to perform the confirming at least by confirming whether a capability granting access to the physical address is found in the root capability register.

10. The system of claim 9, wherein each of the partitions comprises a respective base region, and the memory access logic is configured to perform the confirming at least by: confirming whether the capability granting access to the physical address is found in the respective base region of the currently-executing software module, wherein the root capability grants access to the respective base region of the currently-executing software module.

11. The system of claim 9, wherein each of the partitions comprises a respective base region, and the memory access logic is configured to perform the confirming at least by: confirming whether the capability granting access to the physical address is found in the respective base region of the currently-executing software module, wherein the memory access logic is configured to perform the confirming by: confirming whether the capability granting access to the physical address is found in either of the root capability register or the respective base region of the currently-executing software module, and granting access on condition of being found in either.

12. The system of claim 9, wherein a calling one of the software modules is configured to perform a calling operation to call another, callee one of the software modules, and in doing so to perform a domain transition which switches the root capability in the root capability register from the root capability of the calling software module to the root capability of the callee software module.

13. The system of claim 12, wherein each of the software modules comprises a respective address space executive, being a portion of executable executive code stored in, and fetched from, a respective base region of the respective software module, further comprising further capability registers for holding capabilities loaded from the respective base region of at least the currently-executing software module;
wherein the address space executive is able to use the further capability registers to store capabilities upon domain transition, and/or to use the further capability registers as operands of at least one capability manipulation instruction type.

14. The system of claim 1, wherein the execution logic is configured to execute machine code instructions each being an instance of instruction types defined in an instruction set of the execution logic, wherein one or both of:
the instruction set comprises a memory access instruction type, and the memory access operation and the operations of the memory access logic are invoked by a single instance of a single one of a memory access instruction type; and/or
the instruction set comprises a capability manipulation instruction type and the sharding operation and/or the shard recombination operation is invoked at least in part by an instance of one or more of the capability manipulation instruction type.

15. The system of claim 1, wherein the software modules comprise any one, more or all of:
an application;
at least one operating system, the application being arranged to run on the at least one operating system; and/or
a hypervisor, the at least one operating system being arranged to run on the hypervisor.

16. A computer-implemented method comprising:
running software modules each in a respective partition of a physical address space of a memory using execution logic, including executing a memory access operation performed by a currently-executing one of the software modules, the memory access operation specifying a virtual address in a virtual address range as a target of the memory access operation;
performing, using a memory access logic, operations of:
looking-up a physical address in the physical address space mapped to the virtual address,
confirming that a capability granting access to the physical address is found in a storage location to which the currently-executing software module has access, and granting access to the physical address for performing the memory access operation; and
wherein the capability comprises a respective split count and an execution unit of the execution logic is configured to perform:
a sharding operation whereby the capability is divided into at least two instances, and the division is recorded in a respective split count value of each instance; and
a shard recombination operation whereby the instances are recombined into the capability based on the respective split count values, and a reduction in a number of instances is recorded in the respective split count value of the recombined capability.

17. The computer-implemented method of claim 16, further comprising, based on the respective split count value, not to allowing the capability to be divided more than a maximum number of times by instances of the sharding operation.

18. The computer-implemented method of claim 16, further comprising performing a linear capability transfer operation which transfers one of the instances from the partition of a first of the software modules to the partition of a second of the software modules without retaining that transferred instance in the partition of the first.

19. A computer hardware memory device embodied with executable instructions that, when executed by a processor, cause the processor to perform operations comprising:

running software modules each in a respective partition of a physical address space of a memory using execution logic, including executing a memory access operation performed by a currently-executing one of the software modules, the memory access operation specifying a virtual address in a virtual address range as a target of the memory access operation;

performing, using a memory access logic, operations of:

looking-up a physical address in the physical address space mapped to the virtual address, confirming that a capability granting access to the physical address is found in a storage location to which the currently-executing software module has access, and granting access to the physical address for performing the memory access operation; and wherein the capability comprises a respective split count and an execution unit of the execution logic is configured to perform:

a sharding operation whereby the capability is divided into at least two instances, and the division is recorded in a respective split count value of each instance; and a shard recombination operation whereby the instances are recombined into the capability based on the respective split count values, and a reduction in a number of instances is recorded in the respective split count value of the recombined capability.

20. The computer hardware memory device of claim 19, wherein the operations further comprise, based on the respective split count value, not to allowing the capability to be divided more than a maximum number of times by instances of the sharding operation.

* * * * *